US008012588B2

(12) United States Patent
Izumi et al.

(10) Patent No.: US 8,012,588 B2
(45) Date of Patent: Sep. 6, 2011

(54) LAYERED PRODUCT, OPTICAL PART, PROCESSES FOR PRODUCING THESE, AND COATING FLUID

(75) Inventors: Shinobu Izumi, Shunan (JP); Junji Momoda, Shunan (JP)

(73) Assignee: Tokuyama Corporation (JP)

( * ) Notice: Subject to any disclaimer, the term of this patent is extended or adjusted under 35 U.S.C. 154(b) by 606 days.

(21) Appl. No.: 10/545,880

(22) PCT Filed: Feb. 13, 2004

(86) PCT No.: PCT/JP2004/001576
§ 371 (c)(1),
(2), (4) Date: Aug. 17, 2005

(87) PCT Pub. No.: WO2004/078476
PCT Pub. Date: Sep. 16, 2004

(65) Prior Publication Data
US 2006/0269741 A1 Nov. 30, 2006

(30) Foreign Application Priority Data

| Feb. 17, 2003 | (JP) | 2003-038851 |
| Mar. 20, 2003 | (JP) | 2003-076773 |
| Oct. 17, 2003 | (JP) | 2003-358269 |
| Dec. 19, 2003 | (JP) | 2003-422295 |

(51) Int. Cl.
*B32B 27/24* (2006.01)
*C08G 18/00* (2006.01)

(52) U.S. Cl. ......... 428/425.5; 428/424.2; 524/267; 528/44

(58) Field of Classification Search ........ 428/423.1, 428/425.5, 424.2; 524/261, 267; 528/44
See application file for complete search history.

(56) References Cited

U.S. PATENT DOCUMENTS

| 4,891,269 | A | * | 1/1990 | Markevka et al. ......... 428/423.1 |
| 5,015,321 | A | * | 5/1991 | Jansen et al. ............... 156/331.7 |
| 5,433,891 | A | * | 7/1995 | Chou et al. .................... 516/128 |
| 5,574,124 | A | | 11/1996 | Schmalstieg et al. |
| 5,757,459 | A | * | 5/1998 | Bhalakia et al. ............. 351/168 |
| 5,914,174 | A | | 6/1999 | Gupta et al. |
| 6,025,029 | A | * | 2/2000 | Merz et al. .................. 427/372.2 |
| 6,060,001 | A | | 5/2000 | Welch et al. |
| 6,440,568 | B1 | | 8/2002 | Kayanoki et al. |
| 2002/0076549 | A1 | * | 6/2002 | Welch et al. .................. 428/332 |
| 2004/0220292 | A1 | | 11/2004 | Momoda et al. |
| 2005/0263745 | A1 | | 12/2005 | Momoda et al. |
| 2006/0071203 | A1 | | 4/2006 | Mori et al. |

FOREIGN PATENT DOCUMENTS

| EP | 0 922 971 A1 | 6/1999 |
| EP | 1 130 038 A1 | 9/2001 |
| EP | 1 568 739 A1 | 8/2005 |
| JP | 60-045224 A | 3/1985 |
| JP | 60-75365 A | 4/1985 |
| JP | 60-136702 A | 7/1985 |
| JP | JP 63-87223 A | 4/1988 |
| JP | 1-144520 A | 6/1989 |
| JP | 03-072591 A | 3/1991 |
| JP | 08-012376 A | 1/1996 |
| JP | 08-253317 A | 10/1996 |
| JP | 08318598 A | * 12/1996 |
| JP | 9-080204 A | 3/1997 |
| JP | 11-129337 A | 5/1999 |
| JP | 11-149014 A | 6/1999 |
| JP | 11-246817 A | 9/1999 |
| JP | 11-287901 A | 10/1999 |
| JP | 2000-162437 A | 6/2000 |
| JP | 2002-131702 A | 5/2002 |
| WO | WO 98/37115 A1 | 8/1998 |
| WO | WO 00/36047 A1 | 6/2000 |
| WO | WO 01/02449 A2 | 1/2001 |

OTHER PUBLICATIONS

Machine translation of Iryo (JP 2002-131702).*
Machine translation of Ono (JP 11-149014).*
Machine translation of JP 08318598A.*
Abstract, Patent No. WO 03/011967, published Feb. 13, 2003, Inventor: Momoda et al., Applicant: Tokuyama Corp., entitled "Curable Composition, Cured Article Obtained Therefrom, and Photochromic Optical Material and Process for Producing the Same".

* cited by examiner

*Primary Examiner* — Callie Shosho
*Assistant Examiner* — John Freeman
(74) *Attorney, Agent, or Firm* — The Webb Law Firm

(57) ABSTRACT

A laminated product has a multilayer structure comprising an optical base and a cured polyurethane resin layer formed thereon from a moisture-curable polyurethane resin and/or a precursor therefor. The polyurethane resin layer is formed by applying a coating fluid comprising a moisture-curable polyurethane resin and/or precursor therefor and a solvent having a boiling point of 70° C. or higher and a solubility parameter of 8 or larger. Also provided is a coating material comprising a radical-polymerizable monomer ingredient, a silicone or fluorochemical surfactant, and a photochromic compound. In producing a photochromic optical article, excellent adhesion between a base and a photochromic layer is attained.

5 Claims, No Drawings

LAYERED PRODUCT, OPTICAL PART, PROCESSES FOR PRODUCING THESE, AND COATING FLUID

BACKGROUND OF THE INVENTION

The present invention relates to a laminated product which is suited to optical articles such as plastic lenses or photochromic plastic lenses or materials for the same, a curable composition which has a photochromic property and which can suitably be used in producing photochromic plastic lenses, production processes for the same and a coating liquid used for producing the same.

RELATED ART

Photochromic spectacles are spectacles which lenses are quickly colored in an outdoor irradiated with light containing UV rays such as sunlight to function as sunglasses and which are discolored in an indoor irradiated with no such light to function as ordinary transparent spectacles, and demands thereto grow larger in recent years.

Known as processes for producing plastic lenses having a photochromic property are a process in which lenses having no photochromic property are imbibed on surfaces with photochromic compounds (hereinafter referred to as an imbibition process), a process in which a coating agent (hereinafter referred to as a photochromic coating agent) comprising a curable composition having a photochromic property is applied on the surfaces of plastic lenses and is then cured to provide a resin layer (photochromic coat layer) having a photochromic property (hereinafter referred to as a coating process) and a process in which a photochromic compound is dissolved in a monomer and the monomer is polymerized to thereby directly obtain photochromic lenses (hereinafter referred to as a in mass process).

Besides, a soft base material in which a photochromic compound is liable to be dispersed has to be used as a base material for lenses in the imbibition process described above, and a specific composition has to be used as well in the in mass process in order to allow the good photochromic property to be revealed. On the other hand, the coating process has the advantage that it can provide photochromic property to any lens base material in principle.

Thus, the coating process is an excellent process as a process for producing photochromic plastic lenses, but a technique for forming a photochromic coat layer which has a satisfactory adhesion to a base material or a hard coat layer optionally formed on the photochromic coat layer and which reveals a good photochromic characteristic has not yet been established.

The conventionally known coating processes include, (i) a process in which a photochromic compound dissolved in a urethane oligomer is applied on the surface of lenses and cured (refer to a pamphlet of WO 98/37115), (ii) a process comprising dissolving a photochromic compound in a polymerizable monomer composition comprising a combination of monofunctional, difunctional and multifunctional radically polymerizable monomers, applying the mixture on the surface of lenses and curing (refer to U.S. Pat. No. 5,914,174), (iii) a process comprising dissolving a photochromic compound in a monomer composition comprising a combination of only two or more kinds of difunctional (meth)acryl monomers, applying the mixture on the surface of lenses and curing (refer to a pamphlet of WO 01/02449) and (iv) a process in which a composition comprising N-alkoxymethyl(meth)acrylamide, a catalyst (preferably an acidic catalyst) and a photochromic compound is applied on the surface of lenses and thermally cured (refer to a pamphlet of WO 00/36047).

However, involved in the process (i) described above are the problems that not only the photochromic characteristics are increased in temperature dependency because of a low cross-linking density of the resulting photochromic coat layer, but also the photochromic compound is eluted in a hard coat liquid when applying a hard coat on the photochromic coat layer. Further, the problem that an adhesion between the base material for spectacle lenses and the photochromic coat layer is not satisfactory is involved in the processes of (ii), (iii) and (iv).

Then, the present inventors conducted intensive researches in order to solve the problems described above. As a result thereof, they have succeeded in finding a photochromic coating agent comprising "a curable composition containing a radically polymerizable monomer having a silanol group or a group which forms a silanol group by hydrolysis, an amine compound and a photochromic compound each in a specific amount" as a coating agent providing a coat layer having a high adhesion to a base material (refer to a pamphlet of WO 03/011967), and they have further succeeded as well in obtaining the stable adhesion by blending the adhesive photochromic coating agent described above with a radically polymerizable monomer having a maleimide group (Japanese Patent Application No. 372835/2002; the above coating agents are hereinafter referred to as the adhesive photochromic coating agents as a general term). However, a boiling acceleration test of these adhesive photochromic coating agents carried out assuming use thereof at a high temperature and high humidity condition has resulted in finding that the film is reduced in an adhesion depending on the kind of a base material to allow the coat layer to be peeled off in a certain case.

It is known as a technique for improving an adhesion and an adhesiveness to use a primer to provide a primer layer between matters to be adhered. For example, polyurethane resins, epoxy resins or polyacetal resins are proposed as a primer for elevating an adhesion between a hard coat layer and a lens base material. However, there is no example in which the effects of a primer have been investigated for the purpose of improving an adhesion between a plastic lens base material and the photochromic coat layer described above, as far as the present inventors know.

Then, the present inventors considered that use of these primers might make it possible to improve an adhesion between a plastic lens base material and a photochromic coat layer, and they investigated the effects of various primers and came to obtain the knowledge that the adhesion is improved in a certain case when using a polyurethane resin primer. However, it has been found that when usually used urethane base primers as a primer for a hard coat of plastic lenses are used, the adhesion is improved, but there are some problems in terms of the optical properties and the photochromic characteristics of a laminated product finally obtained.

That is, those of 1) to 3) described below are known as urethane base primers used for plastic lenses, and it has been found that the following problems are involved therein respectively.

1) Polyisocyanate is reacted with an active hydrogen compound to synthesize polyurethane in advance, and a coating material obtained by dissolving the polyurethane in a solvent is applied on a lens base material, followed by volatilizing the solvent, whereby a primer layer is formed. When using this type of the primer, there is such problem that since the resulting primer layer does not have a cross-linking structure, polyurethane constituting the primer layer is eluted in a photochromic coating agent when applying the above coating agent to thereby contaminate the photochromic coating agent, so that the desired photochromic property is not obtained. For example, when a solution obtained by dissolving a polyurethane resin formed by reacting diol with diisocyanate in a solvent, which is described in Japanese Patent Application Laid-Open No. 87223/1988, is applied on a lens base material and then subjected to heat treatment to volatilize the solvent to thereby form a primer layer comprising thermoplastic polyurethane and a photochromic coating agent is applied thereon, the resulting photochromic coat layer is deteriorated in photochromic characteristics.

2) Polyisocyanate and an active hydrogen compound and, if necessary, a curing catalyst are mixed and applied, and then it is heated and cured if necessary, whereby a primer layer is formed. Since polyisocyanate which is not protected by a protective group is used for the primer of this type, the active hydrogen compound is quickly reacted, and the mixed liquid is inferior in a storage stability. Accordingly, the workability and the operability (applying property) in applying the primer are inferior, and there is a problem in the reproducibility of the optical characteristics of the resulting primer layer.

3) Block type polyisocyanate which is deactivated at room temperature by blocking isocyanate groups of polyisocyanate with a protective group such as methyl ethyl ketone and an active hydrogen compound and, if necessary, a curing catalyst are mixed and applied, and then it is cross-linked by heating while deblocking the protective groups, whereby a primer layer is formed. This type of the primer is improved in the storage stability described above, but high temperature is required in order to deblock the protective layers. Further, a high temperature of 140° C. or higher has to be applied in order to strengthen an adhesion with the photochromic coat layer, and such problem that the plastic lens base material is thermally deformed or discolored to a yellow color takes place.

A primer of a humidity-curing type polyurethane resin in which a molecular weight is relatively elevated and in which an isocyanate content in a molecule is controlled to a lower level is available as the urethane base primer. The above primer is reacted, as shown by the name thereof, with moisture in the air to produce carbamic acid, which is decarboxylated to produce amine, and a urea bond is produced by the amine and the remaining isocyanate groups, whereby the primer is cross-linked and cured. Because of a curing mechanism in which it is reacted with moisture and cured, it can not be used in open air. Further, not only it is difficult to form a thin coating film because of the high viscosity, but also there is the problem that bubbles remain in the cured film because of carbon dioxide gas produced in the curing step. Accordingly, there is no example in which this primer is used for optical uses such as lens base materials, and it is used mainly for uses such as construction in which such phenomenon is not a problem.

The present inventors have paid attentions to the fact that it is effective for a rise in the adhesion when using a urethane base primer and the advantage of the humidity-curing type polyurethane resin described above that deformation and discoloration of a lens base material are not brought about by heat, since it is a single liquid and does not require high temperature for cross-linking curing. They have considered if it can be used as a primer for lenses depending on measures and have made further investigations.

As a result thereof, they have found that the applying property is improved by using a specific solvent and further using in combination, if necessary, a leveling agent to make it possible to form a thin coating film by a spin coating method and that when the coating film is decreased in a thickness, bubbles do not remain in the cured film and an adhesive characteristic of the photochromic coat layer can be improved without reducing the optical characteristics and the photochromic characteristics, and thus they have completed the present invention.

The photochromic coating agent disclosed in the pamphlet of WO 03/011967 described above is excellent, but the present inventors have further investigated the above photochromic coating agent to find that the wetting property in applying the above photochromic coating agent is not satisfactory depending on the type of a base material used or when using a urethane base primer in order to elevate the adhesion durability and that the inferior appearance is likely to be occurred by roughness caused in an interface between the photochromic coat layer and the base material or the primer layer.

Accordingly, it is desired to provide a laminated product in which a photochromic coat layer having further improved photochromic characteristics is stuck firmly and stably onto a base material such as plastic lenses and which can suitably be used as photochromic plastic lenses and to provide a photochromic coating agent which further improves an applying property of photochromic monomers and the optical characteristics of the coating film and which provides a photochromic coat layer having a high adhesion to a base material and excellent photochromic characteristics.

The present inventors have found that the wetting property (applying property) to a base material and the optical characteristics of the coating film are elevated when adding a silicone base or fluorine base surfactant to a radically polymerizable monomer containing a photochromic compound, whereby they have come to complete the present invention.

SUMMARY OF THE INVENTION

The present invention which achieves the objects described above includes the following subject matters.

(1) A laminated product comprising a layered structure in which a polyurethane resin layer comprising a cured product of a humidity-curing polyurethane resin and/or a precursor thereof is formed on at least one surface of an optical base material.

(2) The laminated product as described in the item (1), wherein the optical base material has a face constituted from a three dimensional cross-linked product, and the polyurethane resin layer described above is formed on the above face.

(3) The laminated product as described in the item (1) or (2), wherein the polyurethane resin layer described above has a thickness of 0.1 to 10 μm, and bubbles are not substantially present in the above layer.

(4) A production process for the laminated product as described in any of the items (1) to (3), comprising applying a coating liquid comprising a humidity-curing polyurethane resin and/or a precursor thereof and a solvent having a boiling point of 70° C. or higher and a solubility parameter of 8 or more on at least one surface of an optical base material, removing the solvent; and curing the humidity-curing polyurethane resin and/or precursor thereof.

(5) The production process as described in the item (4), wherein the solution of the humidity-curing polyurethane resin and/or the precursor thereof described above further comprises a leveling agent.

(6) A laminated product comprising a layered structure in which a polyurethane resin layer and a resin layer containing a photochromic compound are laminated in this order on a surface of an optical base material.

(7) An optical article comprising the laminated product as described in the above item (1), (2), (3) or (6).

(8) A coating liquid for an optical base material comprising a humidity-curing polyurethane resin and/or a precursor thereof and a solvent having a boiling point of 70° C. or higher and a solubility parameter of 8 or more.

(9) A curable composition comprising 100 parts by weight of a radically polymerizable monomer, 0.001 to 5 parts by weight of a silicone base or fluorine base surfactant and 0.01 to 20 parts by weight of a photochromic compound.

(10) A photochromic cured product obtained by curing the curable composition as described in the above item (9).

(11) A photochromic coating agent comprising the curable composition as described in the above item (9).

(12) A photochromic optical article comprising an optical base material in which at least a part of a surface thereof is covered with a photochromic coat layer comprising a cured product of the photochromic coating agent as described in the item (11).

(13) The laminated product as described in the item (6), wherein the resin layer containing the photochromic compound comprises a cured product of the photochromic coating agent as described in the item (11).

According to the laminated product of the present invention as described in the item (1), (2) or (3), not only the optical characteristics are not deteriorated by the polyurethane resin layer, but also the impact resistance is improved to a large extent by the above layer. Accordingly, not only it is useful in itself as plastic lenses having a high impact resistance, but also because it has a high adhesion (adhesiveness) with the cured films of the adhesive photochromic coating agent described above and the other photochromic coating agents than the above coating agent, it is particularly useful as a raw base material (intermediate material) in producing optical articles such as photochromic plastic lenses by a coating method. That is, the laminated product of the present invention is improved in an impact resistance while maintaining the high optical characteristics of a base material, and it is useful in itself as an optical article such as spectacle lenses. Further, the laminated product of the present invention has the excellent effect that when a photochromic coat layer is formed thereon, it is firmly adhered onto the above photochromic coat layer.

Adopting of the production process of the present invention for the laminated product as described in the item (4) or (5) and the coating liquid of the present invention for an optical base material as described in the item (8), not only makes it possible to carry out application by spin coating to thereby forming a thin coating film having an even thickness though using the humidity-curing polyurethane resin having a high molecular weight, but also makes it possible to prevent bubbles from remaining in the coating film and to thereby producing the laminated product of the present invention having good optical characteristics. That is, the production process and the coating agent according to the present invention make it possible to apply humidity-curing polyurethane resin base primers which have not so far been used for optical uses, and they solve various problems brought about by conventional urethane base primers which have so far been used for optical uses. Further, the present invention is also highly useful as a process for producing photochromic plastic lenses which can stand actual uses by a coating method which can provide a photochromic property regardless of the kind of a base material in the field of plastic lenses.

The other laminated product (6) of the present invention is characterized by that an adhesion between the photochromic coat layer and the base material is improved by allowing the polyurethane resin layer to intervene, and therefore it is useful as photochromic plastic lenses. In particular, the laminated product in which the polyurethane resin layer is a cured product of an optical humidity-curing type urethane base primer can be produced by the coating method having many merits as described above. In addition thereto, the coating layer is stuck stably and firmly, and it is further characterized by that the optical characteristics including the photochromic characteristics are good. The laminated product of the present invention having a photochromic coat layer not only has excellent optical characteristics and photochromic characteristics, but also it shows such a firm adhesion that the photochromic coat layer is not peeled off even under a high humid and severe condition of boiling. Accordingly, the laminated product of the present invention does not cause peeling of the coating film even after used over a long period of time, and it provides photochromic optical articles (for example, photochromic plastic lenses) having a high reliability.

The curable composition (9) of the present invention has the effect that when it is used as a photochromic coating agent, an ability to make a surface of a base material being a state of wetting with coating agent (the wetting property or the applying property) and the optical characteristics of the coating film are enhanced. Among the curable compositions of the present invention described above, (i) the composition in which the radically polymerizable monomer component comprises a mixture of a radically polymerizable monomer component having an L scale Rockwell hardness of 60 or more in a cured product obtained when the radically polymerizable monomer component is homopolymerized and a radically polymerizable monomer component having an L scale Rockwell hardness of 40 or less in the homopolymerized cured product is characterized by that it reveals the effects of the present invention described above when it is used as a photochromic coating agent and that in addition thereto, the photochromic characteristics of the resulting photochromic coat layer are improved.

Further, (ii) the composition comprising 0.5 to 20 parts by weight, particularly 1 to 10 parts by weight of (a) a radically polymerizable monomer having a silanol group or a group which forms a silanol group by hydrolysis (hereinafter referred to simply as a silyl monomer) and/or a radically polymerizable monomer having an isocyanate group (hereinafter referred to simply as an isocyanate monomer) or (b) a compound which has a silanol group or a group forming a silanol group by hydrolysis and which does not have a radically polymerizable group per 100 parts by weight of the whole radical polymer components is characterized by that it reveals the effects of the present invention described above when it is used as a photochromic coating agent and that in addition thereto, an adhesion of the photochromic coat layer to the base material is improved. Further, (iii) the composition which is the curable composition of (ii) described above and in which the radically polymerizable monomer component comprises a mixture of a radically polymerizable monomer component having an L scale Rockwell hardness of 60 or more in a cured product obtained when the radically polymerizable monomer component is homopolymerized and a radically polymerizable monomer component having an L scale Rockwell hardness of 40 or less in the homopolymerized cured product is characterized by having together the characteristics of (i) and (ii) described above.

Then, the curable composition of the present invention not only has a good wetting property (applying property) to a base material when it is used as a photochromic coating agent but also has the excellent characteristics that the photochromic characteristics and optical properties of the resulting photochromic coat layer are good and that the adhesion to the base material is high. Accordingly, the composition of the present invention is useful as a photochromic coating agent in producing photochromic plastic lenses by a coating method.

DETAILED DESCRIPTION OF THE INVENTION

In the laminated product of the present invention, a polyurethane resin layer comprising a cured product of a humidity-curing polyurethane resin and/or a precursor thereof is formed on at least one surface of an optical base material such as a plastic lens base material (in this case, the optical base material means a base material comprising an optical material which has a pair of front and back principal faces). In this case, the optical base material shall not specifically be restricted as long as it is a base material having a light transmission, and it includes publicly known optical base materials such as glasses, plastic lenses and window glasses for houses and cars. Plastic lenses are particularly suitably used.

Publicly known plastic lenses which are used at present, such as thermoplastic resin lenses of (meth)acryl base resins, polycarbonate base resins and the like and cross-linking resin lenses of multifunctional (meth)acryl base resins, acryl base resins, thiourethane base resins, urethane base resins and thioepoxy base resins can be used for plastic lenses. When a polyurethane resin layer is formed by the coating liquid of the present invention for an optical base material, the surface of the optical base material on which the coating liquid for an optical base material is applied is preferably constituted from a three-dimensional cross-linked product, since a room for choice of a solvent for the coating liquid for an optical base material is broadened (in other words, a range of a solvent which does not attack the base material is broad). That is, when the plastic material is a cross-linked resin, it can be used as it is, but when the plastic material is a thermoplastic resin such as a polycarbonate resin, a three-dimensional cross-linked product layer is preferably formed thereon. This three-dimensional cross-linked product layer shall not specifically be restricted, and a so-called hard coat layer can be given as the suitable example thereof.

The most characteristic feature of the laminated product of the present invention is that a urethane resin-layer comprising a cured product of the coating liquid (8) (hereinafter sometimes referred to as "the optical humidity-curing type urethane base primer") of the present invention for an optical base material described above is formed on the surface of the optical base material described above. The formation of the above layer makes it possible to improve an impact resistance of the optical base material and makes it possible, when the adhesive photochromic coating agent described above is applied to form a photochromic coat layer, to raise an adhesion (adhesiveness) of the above coat layer onto the base material.

The cured product constituting the cured product layer described above is a polyurethane resin obtained by curing a humidity-curing polyurethane resin and/or a precursor thereof which is an ingredient of the optical humidity-curing type urethane base primer. As described above, lenses prepared by forming a urethane resin layer on a plastic lens base material are known, but examples in which the humidity-curing polyurethane resin and/or the precursor thereof is used as a primer for an optical material are not known. Accordingly, an optical material having a layer comprising a urethane resin which is the cured product thereof is novel, since the structure thereof corresponds to the structure of a compound before curing, and therefore this urethane resin is naturally different from those obtained by conventional urethane base primers which have so far been used for optical uses.

The humidity-curing polyurethane resin and/or the precursor thereof used in the present invention means isocyanate group-containing compounds in which a part of plural isocyanate groups present in a molecule is reacted with moisture in the air to produce carbamic acid and then it is decarboxylated to produce amines, subsequently the produced amines are reacted with the remaining isocyanate groups to produce urea bonds, whereby they are cross-linked and cured, or compounds which are the precursors of such compounds or a combination of the compounds. Capable of being used are, for example, polyurethane oligomers or polyurethane polymers in which a molecular weight is controlled to a relatively high level, suitably 300 to 5,000, particularly 500 to 3,000 in terms of a number average molecular weight and in which an average content of isocyanate groups present at terminals in one molecule is controlled to 0.01 to 50 mole %, preferably 0.1 to 10 mole % and most preferably 0.5 to 5 mole %; "isocyanate compounds or derivatives thereof" which are the precursors of the above polyurethane oligomers or polyurethane polymers or "the combinations of the above isocyanate compounds or derivatives thereof and active hydrogen-containing compounds". The average content (mole %) of isocyanate groups referred herein means a value obtained by quantifying a mole number of isocyanate groups present in a predetermined amount of a compound by chemical analysis, dividing the mole number of the isocyanate groups thus obtained by a mole number (a value obtained by dividing the predetermined amount of a weight by a number average molecular weight) of the compound contained in the predetermined amount to thereby, calculating a mole number of the isocyanate groups present in one molecule of the compound by further dividing the above mole number by a molecular weight (number average molecular weight) of the compound and expressing the resulting value by %. The above humidity-curing polyurethane resin and/or precursor thereof are commercially available, for example, in the form of primers for constructional uses, and they are available industrially or as reagents.

The examples of the humidity-curing polyurethane resin and/or the precursor thereof which can suitably be used in the present invention include (1) aromatic isocyanate compounds such as tolylenediisocyanate, 4,4-dipenylmethanediisocyanate, xylylenediisocyanate, 1,5-naphthalenediisocyanate, tolidinediisocyanate, triphenylmethanetriisocyanate, tris (isocyanatephenyl) thiophosphate and tetramethylxylenediisocyanate; aliphatic isocyanate compounds such as trimethylhexanemethylenediisocyanate, hexanemethylenediisocyanate, isophoronediisocyanate, hydrogenated 4,4-dipenylmethanediisocyanate, hydrogenated xylylenediisocyanate, lysinediisocyanate, lysine ester triisocyanate, 1,6,11-undecanetriisocyanate, 1,8-diisocyanate-4-isocyanatemethyloctane, 1,3,6-hexamethylenetriisocyanate and bicycloheptanetriisocyanate and/or (2) polyisocyanate compounds or polyisocyanate oligomer compounds obtained by combining the above isocyanate compounds with compounds having active hydrogens by various methods in such a charge ratio that the isocyanate groups remain and (3) polyisocyanates containing at least one sulfur or halogen group and modified products thereof. The examples of the modified products include biuret, isocyanurates, allophanates and carbodiimides. They may be used alone or in combination of two or more kinds thereof.

Among them, preferred from the viewpoint that the excellent adhesion can be revealed at relatively low temperature are aliphatic isocyanate compounds and/or polyisocyanate compounds or polyisocyanate oligomer compounds obtained by combining the above aliphatic isocyanate compounds with compounds having active hydrogens by various methods in such a charge ratio that the isocyanate groups remain, and particularly preferred from the viewpoint of the film coating property are cyclic aliphatic isocyanate compounds and/or polyisocyanate compounds or polyisocyanate oligomer compounds obtained by combining the above cyclic aliphatic isocyanate compounds with compounds having active hydrogens by various methods in such a charge ratio that the isocyanate groups remain.

From the viewpoint that the resulting polyisocyanate compounds or polyisocyanate oligomer compounds are reacted with moisture contained in the air to be cured rapidly, aromatic isocyanate compounds and/or polyisocyanate compounds or polyisocyanate oligomer compounds obtained by combining the above aromatic isocyanate compounds with compounds having active hydrogens by various methods in such a charge ratio that the isocyanate groups remain can suitably be used as well. In this case, as result of reacting moisture with isocyanate, a urea bond is formed, and such urea bond may be contained in the polyurethane resin layer in the present invention.

The compounds having active hydrogens described above include alkylene glycols such as ethylene glycol, 1,2-propylene glycol, 1,3-butanediol, 1,4-butanediol, 1,6-hexanediol, neopentyl glycol, dipropylene glycol and diethylene glycol; polyalkylene glycols such as polypropylene glycol, polyethylene glycol and polytetramethylene glycol; poly(alkylene adipates) such as poly(diethylene adipate), poly(tetramethylene adipate), poly(hexamethylene adipate) and poly(neopentyl adipate); polycaprolactones such as poly-$\epsilon$-caprolactone), polycaprolactonediol and polycaprolactonetriol; polybutanediene glycols such as poly(1,4-butadiene)glycol and poly(1,2-butadiene)glycol; poly(alkylene carbonates) such as poly(hexamethylene carbonate); polyesterpolyols; polyols having three or more hydroxyl groups such as 1,2,4-butanetriol and 1,2,6-hexanetriol; and silicone polyols. The other known active hydrogen-containing compounds can be used as well. Among them, when using polyalkylene glycols, polyols having three or more hydroxy groups, polyalkylene adipates, polyalkylene carbonates, polycaprolactones and polyesterpolyols, the heating temperature in curing can be lowered, and the base material can more surely be prevented from being thermally deformed and discolored.

The compounds having active hydrogens described above may be used alone or in combination of two or more kinds thereof. Particularly when using aromatic isocyanate compounds such as tolylenediisocyanate and 4,4-dipenylmethanediisocyanate as the humidity-curing polyurethane resin and/or the precursor thereof, the resulting polyisocyanate compounds or polyisocyanate oligomers are increased in crystallinity in a certain case, and two or more kinds of the compounds having active hydrogen are preferably used.

The humidity-curing polyurethane resin and/or the precursor thereof in the humidity-curing type urethane base primer used in the present invention has preferably a relatively high molecular weight from the viewpoint of the rapid curing. A method for raising the molecular weight includes a method in which a remaining amount of the isocyanate groups is controlled so that it is reduced when combining the isocyanate compounds described above with the compounds having active hydrogens by various methods in such a charge ratio that the isocyanate groups remain. Or, it includes as well a method in which plural isocyanate groups present in a molecule of the humidity-curing polyurethane resin and/or the precursor thereof are combined by a chain extending agent. Herein, the chain extending agent includes the compounds having active hydrogens described above and diamine compounds such as ethylenediamine, and among them, alkylene glycols such as 1,3-butanediol, 1,4-butanediol, propylene glycol and 1,6-hexanediol and polyalkylene glycols such as polypropylene glycol are suitably used from the viewpoint of an easiness in controlling the chain extending reaction.

A layer comprising the cured product of the optical humidity-curing type urethane base primer described above may comprise only the above cured product, but it may contain fine particle inorganic matters which are usually used well for the purpose of enhancing a surface hardness. In this case, the fine particle inorganic matters have an average particle diameter of preferably about 1 to 300 nm, more preferably about 1 to 200 nm.

The examples of the fine particle inorganic matters include silicon oxide compounds such as silicon dioxide, aluminum compounds such as aluminum trioxide, titanium oxide compounds such as titanium dioxide, zirconium oxide compounds such as zirconium dioxide, tin oxide compounds such as tin dioxide and antimony oxide compounds such as antimony trioxide and antimony pentaoxide.

A thickness of the layer comprising the cured product of the optical humidity-curing type urethane base primer described above shall not specifically be restricted, and it is suitably 0.1 to 10 μm, particularly 1 to 7 μm from the viewpoints of the good optical characteristics and the adhesion (adhesiveness) with the photochromic coat layer optionally formed thereon. It is suitable from the viewpoint of the optical characteristics that bubbles are not substantially present in this layer. In this case, "bubbles are not substantially present" means the state that bubbles are not observed to be present by the result of visual observation. The urethane resin layer having such characteristics (thickness and absence of bubbles) can not be obtained when humidity-curing type polyurethane resin primers which are commercially available for construction materials are used as they are, and it has not been able to be obtained until the production process of the present invention described above is adopted.

A process for producing the laminated product of the present invention shall not specifically be restricted, and the production process of the present invention described above is suitably adopted, that is, it is suitably produced by applying the optical humidity-curing type urethane base primer on at least one surface of the optical base material, then removing the solvent and curing the humidity-curing type polyurethane resin and/or the precursor thereof.

The optical humidity-curing type urethane base primer used in the production process of the present invention shall not specifically be restricted as long as it is a solution containing the humidity-curing type polyurethane resin and/or the precursor thereof and the solvent having a boiling point (atmospheric pressure) of 70° C. or higher and a solubility parameter of 8 or more. In this case, the humidity-curing type polyurethane resin and/or the precursor thereof are the same as explained in the laminated product of the present invention.

The solvent having a boiling point of 70° C. or higher and a solubility parameter of 8 or more used for the optical humidity-curing type urethane base primer described above is a diluent solvent for the humidity-curing type polyurethane resin and the like, and use of such diluent solvent makes it possible to obtain the cured product layer having the excellent characteristics described above. The specific examples of the diluent solvent described above which is suitably used in the present invention include butyl acetate, acetyl acetone, methyl isobutyl ketone, ethylene glycol dimethyl ether, propylene glycol monoethyl ether acetate, xylene, methyl ethyl ketone, methyl acetoacetate, toluene and ethyl acetate. At least one solvent selected from them is suitably used in the production process of the present invention.

A content of the humidity-curing type polyurethane resin and/or the precursor thereof in the above solvents is preferably 5 to 80% by weight based on the total weight of the humidity-curing type polyurethane resin and/or the precursor thereof and the diluent solvent described above, and it falls more preferably in a range of 10 to 50% by weight in order to reduce a trace of carbon dioxide while securing the adhesion.

Further, the optical humidity-curing type urethane base primer used in the present invention preferably contains a leveling agent because of the reason that a smoothness of the coating film is elevated. Publicly known compounds as the leveling agent can be used without any restrictions, and the suitable examples thereof include silicone base, fluorine base, acryl base and vinyl base compounds. A use amount of the above leveling agent is 0.05 to 15% by weight, particularly preferably 0.1 to 10% by weight based on the total weight (weight of the resin components) of the humidity-curing type polyurethane resin and/or the precursor thereof.

Further, the optical humidity-curing type urethane base primer used in the present invention can contain as well the fine particle inorganic matters described above. A content of the above fine particle inorganic matters shall not specifically be restricted, but preferred is 30% by weight or less, particularly suitably 10% by weight or less based on the total weight (weight of the resin components) of the humidity-curing type polyurethane resin and/or the precursor thereof. It shall not provide any problems if various curing agents are contained for the purposes of accelerating curing and enabling to cure at low temperature in the curing step. Various epoxy resin curing agents and various organic silicon resin curing agents are known as the curing agents which are suitably used. The specific examples of the above curing agents include various organic acids and acid anhydrides thereof, nitrogen-containing organic compounds such as tertiary amine compounds, various metal complex compounds such as organic tin compounds and organic zinc compounds, metal alkoxides and various salts such as organic carboxylates and carbonates of alkali metals. In this case, an addition amount thereof is preferably 0.1 to 5% by weight, particularly 0.5 to 2% by weight based on the total weight (weight of the resin components) of the humidity-curing type polyurethane resin and/or the precursor thereof.

A method for applying the optical humidity-curing type urethane base primer on the surface of the optical base material shall not specifically be restricted, and it includes methods such as dipping, spin coating and dip spin coating. An applying method by spin coating is preferably adopted because of the reason that the optical humidity-curing type urethane base primer can be prevented from being stored in the state that it is brought into contact with air containing moisture (the state that the above primer starts to be cured). That is, the optical humidity-curing type urethane base primer is stored in a vessel which can tightly be sealed, and a required amount thereof is taken out when required and applied on the surface of lenses, whereby curing described above can be prevented. An applying method by spin coating is most suited for this. Further, a reduction in a thickness of the coating film makes it possible to rapidly discharge carbon dioxide gas to the outside of the system, whereby traces left on the coating film after carbon dioxide gas is discharged, which cause an optical problem, can be reduced. In this case, the film thickness falls suitably in a range of 0.1 to 10 μm, and it falls particularly preferably in a range of 1 to 7 μm considering the adhesion and the optical characteristics. If it is 10 μm or more, traces left after carbon dioxide gas is discharged notably remain, and therefore it is not preferred. On the other hand, if it is 0.1 μm or less, the adhesion is markedly reduced because of a reduction in an evenness of the film, and therefore it is not preferred as well.

In applying the optical humidity-curing type urethane base primer on the optical base material such as a plastic lens base material, the base material is preferably subjected to pre-treatment before applying for the purpose of enhancing the adhesion. The pre-treatment includes degreasing treatment by an organic solvent, chemical treatment by a basic aqueous solution or an acidic aqueous solution, polishing treatment using an abrasive, plasma treatment using atmospheric pressure plasma or low pressure plasma, corona discharge treatment, flame treatment and UV ozone treatment. From the viewpoint of an adhesion property between the plastic lenses and the primer layer, degreasing treatment by an organic solvent, alkali treatment, plasma treatment, corona discharge treatment or treatment in which they are combined is suitably carried out.

In the production process of the present invention, the optical humidity-curing type urethane base primer is applied in the manner described above, and then the diluent solvent described above is removed, followed by curing the above primer layer. The optical humidity-curing type urethane base primer applied in the thickness described above is considered to be in a state in which it can rapidly be cured by contact with moisture contained in the air (that is a state before decarboxylation), and therefore it can be cured by heating immediately after finishing applying to remove the solvent and carrying out decarboxylation reaction and formation of a urea bond. In this case, the heating temperature shall not specifically be restricted and falls suitably in a range of room temperature to 130° C., particularly 80 to 120° C. at a humidity of 10 to 70% from the viewpoint of preventing the base material from being deformed and discolored by heating. In the process of the present invention, the humidity-curing type polyurethane resin and/or the precursor thereof is used, and therefore it can sufficiently be cured even at such relatively low temperature. The curing time shall not specifically be restricted and falls usually in a range of 10 minutes to 3 hours.

The laminated product of the present invention thus produced can be used in itself as an optical article such as lenses and the like, and it can also be used as a photochromic optical article such as photochromic lenses by further laminating a photochromic coat layer on the primer layer.

All publicly known techniques explained hereinabove in the section entitled RELATED ART can be applied as a method for laminating the photochromic coat layer, and a method comprising coating and curing "a photochromic coating agent (an adhesive photochromic coating agent) comprising a curable composition comprising a radically polymerizable monomer having a silanol group or a group which forms a silanol group by hydrolysis, an amine compound and a photochromic compound each in a specific amount or a photochromic coating agent prepared by further blending the same with a radically polymerizable monomer containing a maleimide group" which is proposed in a pamphlet of WO 03/011967 or Japanese Patent Application No. 372835/2002 by the present inventors is suitably adopted from the viewpoints of the photochromic characteristics, the optical characteristics, a solvent resistance, an abrasion resistance and an adhesion of the photochromic layer.

The radically polymerizable monomer having a silanol group or a group which forms a silanol group by hydrolysis used for the photochromic coating agent includes γ-methacryloyloxypropyltrimethoxysilane, γ-methacryloyloxypropyltriethoxysilane, γ-methacryloyloxypropylmethyldimethoxysilane, (3-acryloyloxypropyl)dimethylmethoxysilane, (3-acryloyloxypropyl)methyldimethoxysilane, (3-acryloyloxypropyl)trimethoxysilane, (methacryloyloxymethyl)dimethylethoxysilane, methacryloyloxymethyltriethoxysilane, methacryloyloxymethyltrimethoxysilane, methacryloyloxypropyldimethylethoxysilane and methacryloyloxypropyldimethylmethoxysilane. A use amount of the above monomer shall not specifically be restricted, and it is suitably 0.5 to 20% by weight, particularly 1 to 10% by weight based on the weight of the whole coating agents.

Examples of the radically polymerizable monomer containing a maleimide group include 4,4'-Diphenylmethanebismaleimide, bis(3-ethyl-5-methyl-4-maleimidephenyl)methane, 2,2-bis[4-(4-maleimidephenoxy)phenyl]propane, m-maleimidebenzoyl-N-hyroxysuccinimide ester and succinimidyl-4-(N-maleimidomethyl)cyclohexane-1-carboxylate. A use amount of the above radically polymerizable monomer shall not specifically be restricted, and it is suitably 0.5 to 15% by weight, particularly 0.1 to 10% by weight based on the weight of the whole coating agents.

The other radically polymerizable monomers which can be used together with the radically polymerizable monomer having a silanol group or a group which forms a silanol group by hydrolysis and the radically polymerizable monomer containing a maleimide group used if necessary, include trimethylolpropane trimethacrylate, trimethylolpropane triacrylate, tetramethylolmethane trimethacrylate, tetramethylolmethane triacrylate, trimethylolpropane triethylene glycol triacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, diethyleneglycol dimethacrylate, triethyleneglycol dimethacrylate, tetraethyleneglycol dimethacrylate, tripropireneglycol dimethacrylate, bisphenol A dimethacrylate, 2,2-bis(4-methacryloyloxyethoxydiphenyl)propane, glycidyl methacrylate, 2,2-bis(4-acryloyloxypolyethylene glycol phenyl)propane having an average molecular weight of 776 and methyl ether polyethylene glycol methacrylate having an average molecular weight of 475. A use amount of the above other radically polymerizable monomers shall not specifically be restricted, and it is suitably 20 to 90% by weight, particularly 40 to 80% by weight based on the weight of the whole coating agents.

Examples of the amine compounds include triethanolamine, N-methyldiethanolamine, triisopropanolamine, N,N-dimethylaminoethyl methacrylate and N,N-diethylaminoethyl methacrylate. A use amount of the amine compound shall not specifically be restricted, and it is suitably 0.01 to 15% by weight, particularly 0.1 to 10% by weight based on the weight of the whole coating agents.

When the photochromic coating layer is formed on the primer layer comprising the cured product of the humidity-curing type polyurethane resin and/or the precursor thereof, the amine compound is not necessarily an essential component. Even a coating agent in which the amine compound is removed from the above adhesive photochromic coating agent can provide a satisfactory adhesion which can stand practical use. Addition of the amine compound enhances the adhesion without fail, but usable time for which the above adhesive photochromic coating agent provides the satisfactory adhesion is restricted, and it has been less liable to be used in terms of actual use.

However, the amine compound does not necessarily have to be added to photochromic coating obtained when using the layer comprising the cured product of the humidity-curing type polyurethane resin and/or the precursor thereof according to the present invention, so that the use time can be extended to a large extent, and it is useful from the use and economical points of view.

Publicly known photochromic compounds such as naphthopyran derivatives, chromene derivatives, spirooxazine derivatives, spiropyran derivatives and flugimide derivatives can be used as the photochromic compound. A use amount of the photochromic compound shall not specifically be restricted, and it is suitably 0.1 to 30% by weight, particularly 1 to 10% by weight based on the weight of the whole coating agents.

When the photochromic coating agent such as the adhesive photochromic coating agent is applied on the primer layer in the laminated product of the present invention, the pre-treatment described above is carried out if necessary, and then the above photochromic coating agent is applied and cured. In this case, the applying method shall not specifically be restricted, and publicly known coating methods can be applied without any restrictions. To be specific, methods applying by spin coating, spray coating, dip coating and dip spin coating are given as the examples thereof. A thickness (corresponding to a thickness of the coat layer after cured) of the coating agent layer coated by the above methods shall not specifically be restricted, and particularly when the photochromic compound is added, the above thickness is preferably relatively large since the satisfactory color density is obtained even in a low concentration of the photochromic compound and a durability of the photochromic characteristics is good. On the other hand, however, the larger the thickness of the coating layer is, the more the initial yellowness increases, and therefore a thickness of the coat layer after cured is preferably 10 to 100 μm, particularly preferably 20 to 50 μm. In order to obtain the above coating thickness, a viscosity of the above composition at 25° C. is suitably controlled to 20 to 1000 cP, particularly suitably 50 to 800 cP and further suitably 70 to 500 cP. In this regard, a solvent and the like are contained in a coating composition such as a coating agent for a hard coat widely used for plastic lenses in order to obtain an even coating film, and therefore a viscosity thereof at 25° C. is usually 5 cP or less. A coating layer obtained therefrom has a thickness of several μm or less. Hence, when comparing with such thickness, the thickness of 10 to 100 μm described above is very large.

A photo-curing method or a heat curing method can suitably be adopted as the curing method depending on the kind of a radical polymerization initiator used. A method comprising curing by irradiation with light with using a photopolymerization initiator and further applying heat to complete polymerization is suitably adopted from the viewpoint of the physical properties and the appearance of the coating film obtained. In this case, a heat polymerization initiator may be used in combination. Electrode lamps or electrodeless lamps such as a metal halide lamp, a ultra high voltage mercury lamp, a high voltage mercury lamp, an intermediate voltage mercury lamp, a bactericidal lamp, a xenon lamp, a carbon arc and a tungsten lamp can be used as a light source used for photo-curing. Further, electron beams may be used as the light source, and in this case, the coating layer can be cured without adding a photopolymerization initiator. A method in which heating is applied in a polymerization furnace to carry out heat polymerization or a method in which an infrared ray is irradiated in a polymerization furnace to carry out polymerization and curing can be given as the heat curing method.

A lens material on which the photochromic coat layer comprising the cured product of the above composition thus prepared is formed can be used as it is, and the surface of the photochromic coat layer is preferably further coated with a hard coat material. Coating with the hard coat layer makes it possible to enhance an abrasion resistance of the above optical material. Publicly known hard coat layer can be used without any restrictions, and examples thereof include those obtained by applying and then curing coating agents for a hard coat comprising silane coupling agents or sols of oxides of metal such as silicon, zirconium, antimony and aluminum as principal components and those obtained by applying and then curing coating agents for a hard coat comprising organic polymers as a principal component. The satisfactory adhesion can be obtained more firmly and simply by adopting a silyl monomer in the above composition.

Further, it is a matter of course that the hard coat layer can be subjected, if necessary, to processing and secondary treatment such as reflection reducing treatment and anti-static treatment by depositing thin films of metal oxides such as $SiO_2$, $TiO_2$ and $ZrO_2$ and applying thin films of organic polymers on the hard coat layer.

On the other hand, the photochromic coating agent disclosed in the pamphlet of WO 03/011967 described above is excellent, but it has found that a wetting property in applying the above photochromic coating agent is not satisfactory depending on the material of the base material used or when using a urethane base primer in order to elevate the adhesion durability and that the inferior appearance is likely to be brought about by roughness caused in an interface between the photochromic coat layer and the base material or the primer layer.

When such inconvenience is brought about, such problem can be solved by using the photochromic curing composition of the present invention explained below.

That is, the photochromic curing composition of the present invention comprises 100 parts by weight of the radically polymerizable monomer component, 0.001 to 5 parts by weight of the silicone base or fluorine base surfactant and 0.01 to 20 parts by weight of the photochromic compound.

The radically polymerizable monomer used in the present invention shall not specifically be restricted, and as is the case with the radically polymerizable monomer used in the photochromic coating agent disclosed in WO 03/011967 described above, it comprises preferably a mixture of a radically polymerizable monomer (hereinafter referred to as a high hardness monomer) component having an L scale Rockwell hardness of 60 or more in a cured product obtained when homopolymerized and a radically polymerizable monomer (hereinafter referred to as a low hardness monomer; this component contains as well a radically polymerizable monomer which is not homopolymerized) component having an L scale Rockwell hardness of 40 or less in a homopolymerized cured product because of the reason that the photochromic characteristics of the resulting photochromic coat layer are good. Further, capable of being used as well is a monomer which is neither the high hardness monomer nor the low hardness monomer each described above, that is, a monomer (hereinafter referred to as an intermediate hardness monomer) in which an L scale Rockwell hardness of a homopolymerized cured product exceeds 40 and shows less than 60.

The L scale Rockwell hardness means a hardness measured according to JIS-B7726, and it can readily be judges by measuring the hardnesses of the homopolymers of the respective monomers whether or not the requisites of the hardness described above are satisfied. To be specific, as shown in examples described later, a monomer is polymerized to obtain a cured product having a thickness of 2 mm, and after this is held in a room of 25° C. for one day, the L scale Rockwell hardness is measured by means of a Rockwell hardness meter, whereby it can readily be confirmed. Provided that in the polymer subjected to the measurement of the L scale Rockwell hardness described above, 90% or more of polymerizable groups in the charged monomer has to be polymerized. If 90% or more of the polymerizable groups is polymerized, an L scale Rockwell hardness of the cured product is measured usually as an almost constant value.

The high hardness monomer described above has an effect to enhance a solvent resistance, a hardness and a heat resistance of the cured product after curing. A radically polymerizable monomer in which an L scale Rockwell hardness of the homopolymer shows 65 to 130 is preferably used in order to increase the above effects. Further, the low hardness monomer described above has effects to toughen the cured product and raise a fading speed of the photochromic compound.

The contents of the high hardness monomer, the low hardness monomer and the intermediate hardness monomer contained in the radically polymerizable monomer component in the composition of the present invention shall not specifically be restricted, and they are preferably 5 to 70% by weight for the low hardness monomer, 5 to 95% by weight for the high hardness monomer and the balance for the intermediate hardness monomer based on the whole radically polymerizable monomers in order to well balance the cured product characteristics such as a solvent resistance, a hardness and a heat resistance of the cured product and the photochromic characteristics such as a color density and a fading speed. Further, a monomer having 3 or more radically polymerizable groups is particularly preferably blended as the high hardness monomer in a proportion of at least 5% by weight or more based on the radically polymerizable monomers.

Because of the reason that an adhesion to the base material of the photochromic layer obtained by using the photochromic coating agent is improved, the radically polymerizable monomer component in the composition of the present invention suitably contains a silyl monomer and/or an isocyanate monomer as the high hardness monomer, the low hardness monomer or the intermediate hardness monomer in an amount of 0.5 to 20 parts by weight, particularly 1 to 10 parts by weight per 100 parts by weight of the whole radically polymerizable monomer components.

Further, because of the reasons that an adhesion to the base material of the photochromic layer obtained by using the photochromic coating agent is enhanced more and that a durability of the photochromic compound contained in the layer can be raised, the radically polymerizable monomer component in the composition of the present invention suitably contains a radically polymerizable monomer having at least one epoxy group and at least one radically polymerizable group (hereinafter referred to merely as an epoxy base monomer) as the high hardness monomer, the low hardness monomer or the intermediate hardness monomer in a proportion of 0.01 to 30% by weight, particularly 0.1 to 20% by weight based on the weight of the whole radically polymerizable monomer components.

The high hardness monomer, the low hardness monomer, the intermediate hardness monomer, the silyl monomer, the isocyanate monomer and the epoxy base monomer each described above are recommended to be used as well in the photochromic coating agent disclosed in WO 03/011967 described above. The same ones as the high hardness monomer, the low hardness monomer, the intermediate hardness monomer, the silyl monomer, the isocyanate monomer and the epoxy base monomer each described above which can suitably be used in WO 03/011967 described above can suitably be used as the high hardness monomer, the low hardness monomer, the intermediate hardness monomer, the silyl monomer, the isocyanate monomer and the epoxy base monomer in the present invention.

The specific examples of the high hardness monomer which can suitably be used in the present invention include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, caprolactone-modified dipentaerythritol hexaacrylate, ditrimethylolpropane tetraacrylate and the like; tetrafunctional polyester oligomers having a molecular weight of 2,500 to 3,500 (Daicel UCB Co., Ltd., EB 80 and the like), tetrafunctional polyester oligomers having a molecular weight of 6,000 to 8,000 (Daicel UCB Co., Ltd., EB 450 and the like), hexafunctional polyester oligomers having an average molecular weight of 45,000 to 55,000 (Daicel UCB Co., Ltd., EB 1830 and the like), tetrafunctional polyester oligomers having a molecular weight of 10,000 (Dai-Ichi Kogyo Seiyaku CO., LTD., GX8488B and the like); bisphenol A dimethacrylate, 2,2-bis(4-methacryloyloxyethoxyphenyl)propane, 2,2-bis(3,5-dibromo-4-methacryloyloxyethoxyphenyl)propane and the like; ethylene glycol diacrylate, ethylene glycol dimethacrylate, 1,4-butylene glycol dimethacrylate, 1,9-nonylene glycol dimethacrylate, neopentylene glycol dimethacrylate, neopentylene glycol diacrylate and the like; diethylene glycol dimethacrylate, triethylene glycol dimethacrylate, tetraethylene glycol dimethacrylate, tripropylene glycol dimethacrylate, tetrapropylene glycol dimethacrylate and the like; bisphenol A diglycidyl methacrylate, ethylene glycol bisglycidyl methacrylate, glycidyl methacrylate and the like.

The specific examples of the low hardness monomer which can suitably be used in the present invention include alkylene glycol di(meth)acrylates such as trialkylene glycol diacrylate, tetraalkylene glycol diacrylate, nonylalkylene glycol diacrylate, nonylalkylene glycol dimethacrylate and the like; 2,2-bis(4-acryloyloxypolyethylene glycol phenyl)propane having an average molecular weight of 776 and the like; polyalkylene glycol (meth)acrylates such as polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene methacrylate having an average molecular weight of 430, polypropylene methacrylate having an average molecular weight of 622, methyl ether polypropylene glycol methacrylate having an average molecular weight of 620, polytetramethylene glycol methacrylate having an average molecular weight of 566, octyl phenyl ether polyethylene glycol methacrylate having an average molecular weight of 2,034, nonyl ether polyethylene glycol methacrylate having an average molecular weight of 610, methyl ether polyethylene thioglycol methacrylate having an average molecular weight of 640, perfluoroheptylethylene glycol methacrylate having an average molecular weight of 498 and the like; stearyl methacrylate, lauryl methacrylate, ethylhexyl methacrylate, methyl acrylate, ethyl acrylate, butyl acrylate, lauryl acrylate and the like. Among the above low hardness monomers, particularly preferred are methyl ether polyethylene glycol methacrylate having an average molecular weight of 475, methyl ether polyethylene glycol methacrylate having an average molecular weight of 1,000, trialkylene glycol diacrylate, tetraalkylene glycol diacrylate, nonylalkylene glycol diacrylate, methyl acrylate, ethyl acrylate, butyl acrylate and lauryl acrylate.

The specific examples of the intermediate hardness monomer which can suitably used in the present invention include difunctional (meth)acrylates such as polytetramethylene glycol dimethacrylate having an average molecular weight of 650, polytetramethylene glycol dimethacrylate having an average molecular weight of 1,400 and bis(2-methacryloyloxyethylthioethyl)sulfide; polyvalent allyl compounds such as diallyl phthalate, diallyl isophthalate, diallyl tartrate, epoxy diallyl succinate, diallyl fumarate, diallyl chlorendate, diallyl hexaphthalate and allyl diglycol carbonate; polyvalent thioacrylic acid and polyvalent thiomethacrylic acid ester compounds such as 1,2-bis(methacryloylthio)ethane, bis(2-acryloylthioethyl)ether and 1,4-bis(methacryloylthiomethyl)benzene; unsaturated carboxylic acids such as acrylic acid, methacrylic acid, and maleic anhydride; acrylic acid and methacrylic acid ester compounds such as methyl methacrylate, butyl methacrylate, benzyl methacrylate, phenyl methacrylate, 2-hydroxyethyl methacrylate and biphenyl methacrylate; fumaric acid ester compounds such as diethyl fumarate and diphenyl fumarate; thioacrylic acid and thiomethacrylic acid ester compounds such as methyl thioacrylate, benzyl thioacrylate and benzyl thiomethacrylate; vinyl compounds such as styrene, chlorostyrene, methylstyrene, vinylnaphthalene, α-methylstyrene dimer, bromostyrene, divinylbenzene and vinylpyrrolidone; and radically polymerizable monofunctional monomers including (meth)acrylates which have unsaturated bonds in molecules and in which hydrocarbon chains have 6 to 25 carbon atoms, such as oleyl methacrylate, nerol methacrylate, geraniol methacrylate, linalool methacrylate and farnesol methacrylate.

The specific examples of the silyl monomer which can suitably be used in the present invention include γ-methacryloyloxypropyltrimethoxysilane, γ-methacryloyloxypropyltriethoxysilane, γ-methacryloyloxypropylmethyldimethoxysilane, (3-acryloyloxypropyl) dimethylmethoxysilane, (3-acryloyloxypropyl) methyldimethoxysilane, (3-acryloyloxypropyl) trimethoxysilane, (methacryloyloxymethyl) dimethylethoxysilane, methacryloyloxymethyltriethoxysilane, methacryloyloxymethyltrimethoxysilane, methacryloyloxypropyldimethylethoxysilane, methacryloyloxypropyldimethylmethoxysilane and the like.

The specific examples of the isocyanate monomer which can suitably be used in the present invention include 2-isocyanatoethoxy methacrylate and 4-(2-isocyanatoisopropyl)styrene.

The specific examples of the epoxy base monomer which can suitably used be in the present invention include glycidyl acrylate, glycidyl methacrylate, β-methylglycidyl methacrylate, bisphenol A-monoglycidyl ether-methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate and glycidyloxypolyethylene glycol methacrylate having an average molecular weight of 540. Among them, glycidyl acrylate, glycidyl methacrylate and glycidyloxypolyethylene glycol methacrylate having an average molecular weight of 540 are particularly preferred.

The composition of the present invention contains 0.001 to 5 parts by weight of a silicone base or fluorine base surfactant per 100 parts by weight of the radically polymerizable monomer component described above. Addition of a specific amount of the silicone base or fluorine base surfactant makes it possible to enhance the wetting property to the base material and to prevent the inferior appearance from being caused without exerting adverse effects on the photochromic characteristics and the adhesion thereof to the base material of the cured coating film (photochromic coat layer) obtained when using the composition of the present invention as the photochromic coating agent. When using surfactants other than the silicone base and fluorine base surfactants (for example, glycerin fatty acid esters and polyoxyethylene alkyl ethers), a little effect to raise the wetting property is observed, but an inferior appearance of the coating film can not be solved. Further, an addition amount thereof has to be increased in order to obtain the satisfactory wetting property using the other surfactants, and an adhesion of the cured film to the base material and a photochromic performance thereof are reduced. From the viewpoint of the effects, a content of the silicone base or fluorine base surfactant is suitably 0.01 to 2 parts by weight, particularly 0.02 to 1 part by weight per 100 parts by weight of the radically polymerizable monomer component.

Publicly known surfactants having a silicone chain (polyalkylsiloxane unit) as a hydrophobic group can be used as the silicone base surfactant which is used in the present invention without any restrictions, but compounds represented by formulas described below are suitably used from the viewpoint of an easiness in the availability:

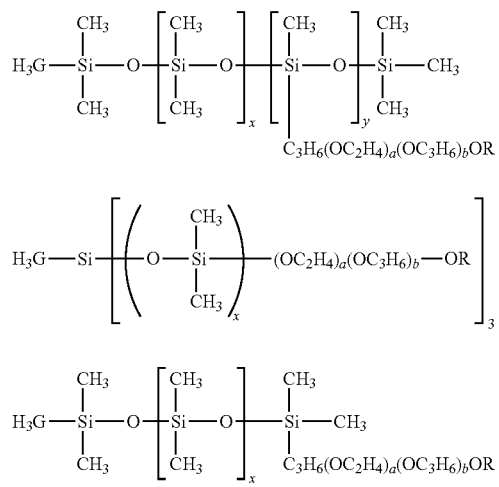

wherein R is an alkyl group; each of a, b and x is independently an integer of 0 to 20; and y is an integer of 1 to 20.

The fluorine base surfactant shall not specifically be restricted as long as it is a surfactant having a fluorinated carbon chain, and ester base oligomers containing a perfluoroalkyl group, perfluoroalkyl group-containing alkylene oxide adducts and fluorine base aliphatic polymer esters can be used.

The specific examples of the silicone base surfactant and the fluorine base surfactant which can suitably be used in the present invention include "L-7001", "L-7002", "L-7604" and "FZ-2123" each manufactured by Nippon Unicar Co., Ltd., "Megafac F-470", "Megafac F-1405" and "Megafac F-479" each manufactured by Dainippon Ink & Chemicals Inc. and "Florad FC-430" manufactured by Sumitomo 3M Ltd.

Publicly known photochromic compounds can be used as the photochromic compound which is used in the curable composition of the present invention without any restrictions. For example, photochromic compounds such as flugimide compounds, spirooxazine compounds and chromene compounds are known well, and the above photochromic compounds can be used in the present invention without any restrictions. The same compounds as the photochromic compounds which can suitably be used in the photochromic coating agent disclosed in, for example, WO 03/011967 described above can suitably be used.

To specifically give the examples of the photochromic compounds which can suitably be used in the present invention, the following compounds can be exemplified:

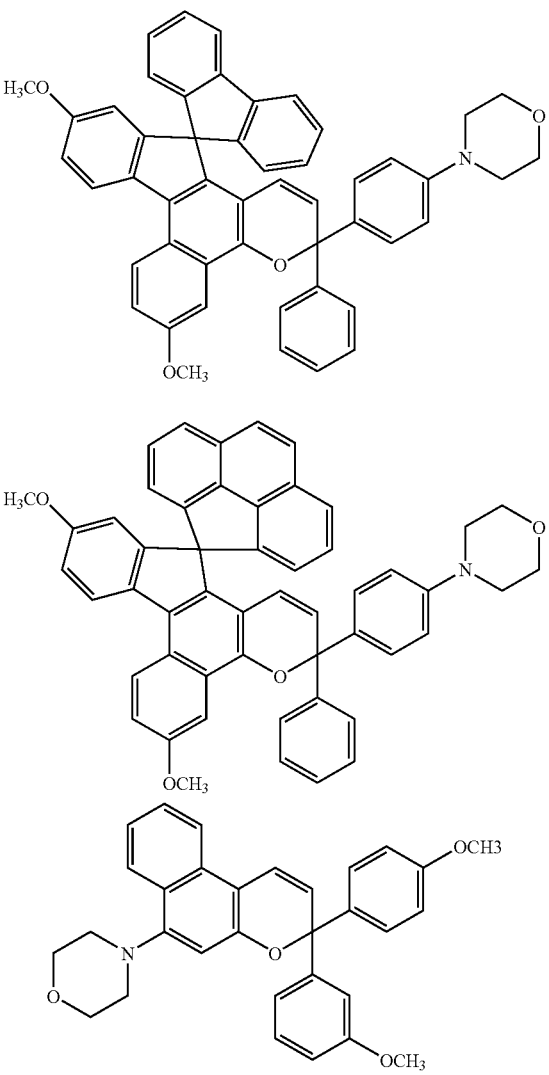

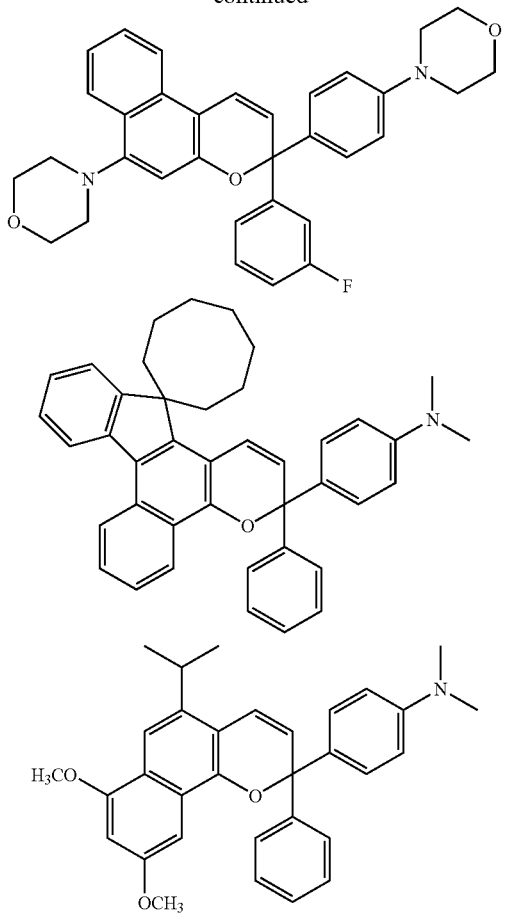

Different kinds of the photochromic compounds described above are suitably used in a suited mixture in order to obtain the preferred color tone.

In the curable composition of the present invention, a blend amount of the photochromic compound falls in a range of 0.01 to 20 parts by weight, preferably 0.05 to 15 parts by weight and more preferably 0.1 to 10 parts by weight per 100 parts by weight of the whole radically polymerizable monomers. If a blend amount of the photochromic compound is less than 0.01 part by weight, the color density is lowered in a certain case. On the other hand, if it is more than 20 parts by weight, the compound is not sufficiently dissolved in the polymerizable monomer, and therefore the mixture becomes uneven, so that an unevenness in the color density is brought about in a certain case.

In the curable composition of the present invention, a compound which is a compound other than the silyl monomer and which has a silanol group or a group forming a silanol group by hydrolysis can further be contained in place of the silyl monomer and/or the isocyanate monomer described above or in combination with these monomers in order to improve an adhesion to the base material with the photochromic layer obtained by using the photochromic coating agent. The above compound includes γ-aminopropyltriethoxysilane, γ-aminopropylmethyldimethoxysilane, γ-glycidoxypropyltrimethoxysilane, γ-glycidoxypropylmethyldimethoxysilane and γ-glycidoxypropylmethyldiethoxysilane. A use amount of the above silane coupling agents shall not specifically be restricted, and it is suitably 0.5 to 20 parts by weight, particularly 1 to 10 parts by weight per 100 parts by weight of the whole radically polymerizable monomers.

Additives such as an antioxidant, a radical scavenger, a UV stabilizer, a UV absorber, a mold releasing agent, a coloring preventive, an anti-static agent, a fluorescent dye, a dye, a pigment, a perfume and a plasticizer may further be added to the curable composition of the present invention in order to elevate a durability of the photochromic compound, the coloring speed, the fading speed and the moldability. A polymerization initiator which shall be described later is very preferably blended in order to cure the curable composition. Publicly known compounds are used as the above additives without any restrictions.

Hindered amine photostabilizers, hindered phenol antioxidants, phenol base radical scavengers, sulfur base antioxidants, benzotriazole base compounds and benzophenone base compounds can suitably be used as the above antioxidant, radical scavenger, UV stabilizer and UV absorber. The above antioxidants, radical scavengers, UV stabilizers and UV absorbers may be used in a mixture of two or more kinds thereof. The addition amounts of the above antioxidants, radical scavengers, UV stabilizers and UV absorbers fall preferably in a range of 0.001 to 20 parts by weight per 100 parts by weight of the whole radically polymerizable monomers.

A process for curing the curable composition of the present invention to obtain a photochromic cured product shall not specifically be restricted, and publicly known processes can be adopted according to the kind of the radically polymerizable monomers used. The polymerization can be initiated by using radical polymerization initiators such as various peroxides and azo compounds, irradiation with UV rays, α rays, β rays and γ rays or using both in combination.

The radical polymerization initiators shall not specifically be restricted, and publicly known compounds can be used. The representative examples thereof include diacyl peroxides such as benzoyl peroxide, p-chlorobenzoyl peroxide, decanoyl peroxide, lauroyl peroxide, acetyl peroxide and the like; peroxy ethers such as t-butylperoxy-2-ethylhexanoate, t-butylperoxy dicarbonate, cumylperoxy neodecanate, t-butylperoxy benzoate and the like; percarbonates such as diisopropylperoxy dicarbonate, di-2-ethylhexylperoxy dicarbonate, di-sec-butyloxy carbonate and the like; and azo compounds such as 2,2'-azobisisobutyronitrile, 2,2'-azobis(4-dimethylvaleronitrile), 2,2'-azobis(2-methylbutyronitrile), 1,1'-azobis(cyclohexane-1-carbonitrile) and the like. A use amount of the above radical polymerization initiators is varied depending on polymerization condition, the kind of the initiator and the kind and the compositions of the radical polymerization initiators, and can not definitely be limited, and in general, it is suitably used in a range of 0.01 to 10 parts by weight per 100 parts by weight of the whole radically polymerizable monomers.

The radical polymerization initiators described above may be used alone or in a mixture of a plurality thereof.

When polymerization is carried out by irradiation with light such as UV rays, preferably used as the polymerization initiator are benzoin, benzoin methyl ether, benzoin butyl ether, benzophenol, acetophenone, 4,4'-dichlorobenzophenone, diethoxyacetophenone, 2-hydroxy-2-methyl-1-phenylpropane-1-one, benzyl methyl ketal, 1-(4-isopropylphenyl)-2-hydroxy-2-methylpropane-1-one, 1-hydroxycyclohexyl phenyl ketone, 2-isopropylthiooxantone, bis(2,6-dimethoxybenzoyl-2,4,4-trimethyl-pentylphosphine oxide, bis(2,4,6-trimethylbenzoyl)-phenylphosphine oxide, 2,4,6-trimethylbenzoyldiphenylphophine oxide, 2-benzyl-2-dimethylamino-1-(4-morpholinophenyl)-butanone-1 and the like. In general, the above photopolymerization initiators are used in a range of 0.01 to 5 parts by weight per 100 parts by weight of the whole radically polymerizable monomers.

The particularly preferred polymerization process is a process comprising curing the curable composition of the present invention blended with the photopolymerization initiator described above with UV irradiation and heating to thereby complete the polymerization.

The curable composition of the present invention is cured by using the polymerization initiators described above and can be used alone as a photochromic material, but it is particularly preferably used as a coating agent for coating optical materials such as spectacle lenses. The curable composition of the present invention has an excellent wetting property particularly to a urethane base primer layer formed on the optical materials described above and can form a photochromic layer having a high adhesion.

The above optical materials shall not specifically be restricted and include publicly known optical materials such as spectacle lenses and window glasses of houses and cars.

Plastic spectacle lenses of (meth)acryl resins, polycarbonate resins, allyl resins, thiourethane resins, urethane resins and thioepoxy resins and glass spectacle lenses are publicly known as the spectacle lenses, and when the curable composition of the present invention is used as a coating material for spectacle lenses, any spectacle lenses can be used without specific restrictions. It is more preferably used as a coating material for plastic spectacle lenses, and it is more preferably used as a coating material for spectacle lenses of (meth)acryl resins, polycarbonate resins, allyl resins, thiourethane resins, urethane resins and thioepoxy resins.

When it is used as a coating material for coating optical materials such as spectacle lenses, preferred is a process comprising coating the curable composition of the present invention on the optical material by spin coating or dipping, and curing the coat by irradiation with light, or a process comprising curing by heat, and more preferred is a process comprising curing by irradiating with light and further heating to thereby complete the polymerization.

A thickness of the above coating layer shall not specifically be restricted, and the above thickness is preferably relatively large since the satisfactory color density is obtained even in a low concentration of the photochromic compound and a durability of the photochromic characteristics is good. On the other hand, however, the larger the thickness of the coating layer is, the more the initial yellowness increases, and therefore a thickness of the above coating layer is preferably 10 to 100 μm, more preferably 20 to 50 μm.

Further, a laminated product having a primer layer between the coating film of the curable composition of the present invention and the base material described above may be formed. In this case, the primer layer is particularly preferably a layer comprising a cured product of the humidity-curing polyurethane resin and/or the precursor thereof according to the present invention from the viewpoint of the adhesion.

The present invention shall be explained below with reference to examples and comparative examples, but the present invention shall not be restricted to these examples.

Example 1

CR39 (allyl resin plastic lens; refractive index=1.50) was used as a lens base material, and this lens base material was sufficiently degreased by acetone. A humidity-curing type primer "Takenate M-605N" manufactured by Mitsui Takeda Chemical Co., Ltd. as a primer and butyl acetate were blended in a weight ratio of 1:1 and sufficiently stirred under nitrogen atmosphere until the mixture was homogenized. The above primer had an isocyanate group content of 2.4 mole % which was determined by an amine equivalent method. This was spin-coated by means of a spin coater 1H-DX2 manufactured by MIKASA Co., Ltd. This coat was cured at 110° C. for one hour in a constant temperature device to prepare a lens base material having a primer layer. The surface thereof was subjected to treatment as pre-treatment for the lens base material by means of a corona treating apparatus MultiDyne manufactured by Navitas Co., Ltd. in order to prepare a photochromic cured film. As for a photochromic polymerizable composition, 2,2-Bis(4-methacryloyloxypentaethoxyphenyl)propane/polyethylene glycol diacrylate (average molecular weight: 532)/trimethylolpropane trimethacrylate/polyester oligomer hexaacrylate (EB-1830, Daicel UCB Co., Ltd.)/glycidyl methacrylate which were radically polymerizable monomers were blended respectively in a blend proportion of 50 parts by weight/15 parts by weight/15 parts by weight/10 parts by weight/10 parts by weight. To 100 parts by weight of the above mixture of the radically polymerizable monomers were added 2.35 parts by weight of a photochromic compound having a structure represented by:

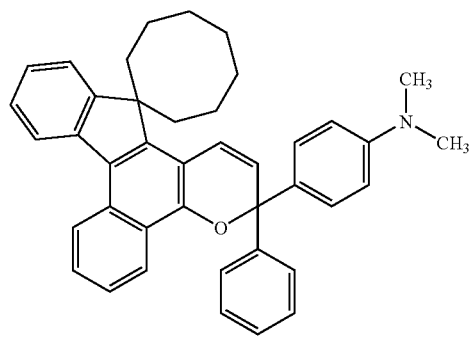

0.6 part by weight of a photochromic compound having a structure represented by:

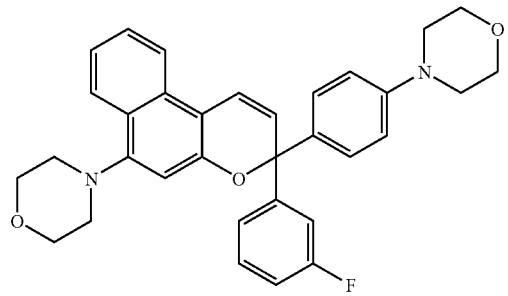

and 0.4 part by weight of a photochromic compound having a structure represented by:

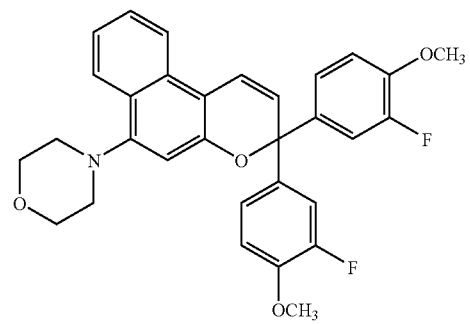

and after sufficiently mixing them, 0.5 part by weight of 1-hydroxycyclohexyl phenyl ketone as a polymerization initiator, 5 parts by weight of bis(1,2,2,6,6-pentamethyl-4-piperidyl) sebacate as a stabilizer, 7 parts by weight of γ-methacryloyloxypropyltrimethoxysilane as a silane coupling agent and 3 parts by weight of N-methyldiethanolamine were added thereto and sufficiently mixed.

Subsequently, about 2 g of the mixed liquid obtained by the method described above was spin-coated on the surface of the lens base material by means of the spin coater 1H-DX2 manufactured by MIKASA Co., Ltd. This lens having a coated surface was irradiated for 3 minutes in nitrogen gas atmosphere by means of a metal halide lamp having an output of 120 mW/cm$^2$ to cure the coating film, and then it was further subjected to heat treatment in a constant temperature device of 120° C., whereby a photochromic cured thin film was obtained. A film thickness of the thin film obtained can be controlled by the conditions of spin coating. In the present invention, a film thickness of the photochromic cured thin film was controlled to 40±1 μm. The appearance of the lens base material having the photochromic cured thin film thus prepared was evaluated by projecting light onto the lens base material having the cured film by means of a projector to observe and evaluate the projected face thereof. The evaluation criteria are shown below.

A: flat and irregularities are not observed at all
B: fine irregularities are very slightly observed
C: irregularities are partially observed
D: irregularities are evenly observed or an influence is observed on the base material The appearance of the lens base material prepared by the method described above was evaluated as the rank A.

Subsequently, the adhesion was evaluated. In respect to the evaluation method, the lens base material having a photochromic cured film was dipped in boiling water of 100° C. for one hour and then cooled down to room temperature, and it was subjected to a crosshatch test within 30 minutes. The evaluation criteria are shown below.

A: no peeling
B: peeling of less than 5%
C: peeling of 5% or more and less than 15%
D: peeling of 15% or more An adhesion of the lens base material prepared by the method described above was ranked as A.

Example 2

A photochromic cured film was prepared by the same method as in Example 1, except that a humidity-curing type primer "Takenate M-402P" manufactured by Mitsui Takeda Chemical Co., Ltd. was used as a primer, and the appearance and the adhesion thereof were evaluated. The above primer had an isocyanate group content of 2.6 mole %. The results thereof are summarized in Table 1.

Example 3

A photochromic cured film was prepared by the same method as in Example 1, except that a humidity-curing type primer "Takenate M-631N" manufactured by Mitsui Takeda Chemical Co., Ltd. was used as a primer, and this and butyl acetate were blended in a weight ratio of 1:2 and sufficiently stirred under nitrogen atmosphere until the mixture was homogenized and that 1 part by weight of a silicone base leveling agent "L-7001" manufactured by Nippon Unicar Co., Ltd. was added as a leveling agent and sufficiently stirred under nitrogen atmosphere until the mixture was homogenized. The appearance and the adhesion thereof were evaluated. The above primer had an isocyanate group content of 4.2 mole %. The results thereof are summarized in Table 1.

Example 4

A photochromic cured film was prepared by the same method as in Example 1, except that a humidity-curing type primer "Takeseal No. 400 Primer" manufactured by Takebayashi Chemical Ind. Co., Ltd. was used as a primer component and that this and xylene were blended in a weight ratio of 1:3 and sufficiently stirred under nitrogen atmosphere until the mixture was homogenized. The appearance and the adhesion thereof were evaluated. The above primer had an isocyanate group content of 3.6 mole %. The results thereof are summarized in Table 1.

Example 5

A photochromic cured film was prepared by the same method as in Example 1, except that a humidity-curing type primer "Primer PFR" manufactured by Takebayashi Chemical Ind. Co., Ltd. was used as a primer component, and this and butyl acetate were blended in a weight ratio of 2:1 and sufficiently stirred under nitrogen atmosphere until the mixture was homogenized and that 1 part by weight of a leveling agent "Fluorod FC-470" manufactured by Sumitomo 3M Co., Ltd. was added as a leveling agent and sufficiently stirred under nitrogen atmosphere until the mixture was homogenized. The appearance and the adhesion thereof were evaluated. The above primer had an isocyanate group content of 2.4 mole %. The results thereof are summarized in Table 1.

Example 6

A photochromic cured film was prepared by the same method as in Example 1, except that a humidity-curing type primer "Urethane Primer 06" manufactured by Alps Chemical Co., Ltd. was used as a primer component, and the appearance and the adhesion thereof were evaluated. The above primer had an isocyanate group content of 0.8 mole %. The results thereof are summarized in Table 1.

Example 7

A photochromic cured film was prepared by the same method as in Example 1, except that a polycarbonate lens base material on which a thermosetting hard coat agent "NSC1274" manufactured by Nippon Fine Chemical Co., Ltd. was coated in a film thickness of 2 μm and then cured on the condition of 110° C. for one hour was used as a lens base material and that the humidity-curing type primer "Takenate M-402P" manufactured by Mitsui Takeda Chemical Co., Ltd. was used as a primer, and the appearance and the adhesion thereof were evaluated. The results thereof are summarized in Table 1.

Example 8

A photochromic cured film was prepared by the same method as in Example 1, except that a polycarbonate lens base material on the surface of which a photo-curing hard coat agent "UVHC1105" manufactured by GE Toshiba Silicones Co., Ltd. was coated in a film thickness of 2 μm and then cured by irradiating for 2 minutes under nitrogen atmosphere by means of a metal halide lamp of 120 W was used as a lens base material and that the humidity-curing type primer "Urethane Primer 06" manufactured by Alps Chemical Co., Ltd. was used as a primer, and the appearance and the adhesion thereof were evaluated. The results thereof are summarized in Table 1.

Example 9

The same procedure as in Example 1 was carried out, except that in Example 1, no N-methyldiethanolamine was added to the photochromic curable composition and that a curing time of the primer was changed to 2 hours at 120° C. The results thereof are summarized in Table 1.

Example 10

The same procedure as in Example 9 was carried out, except that in Example 9, 1.5 part by weight of 4,4'-diphenylmethanebismaleimide was added and that a curing time of the primer was changed to 2 hours at 110° C. The results thereof are summarized in Table 1.

Example 11

The same procedure as in Example 1 was carried out, except that 550 g of polycaprolactonetriol (product name: Praxel 305, manufactured by Daicel Chemical Co., Ltd.) was reacted with 524 g of hydrogenated 4,4-diphenylmethanediisocyanate to obtain a polyisocyanate compound, and this polyisocyanate compound was used as the primer component for the humidity-curing urethane resin and that 0.3 part by weight of a leveling agent "FZ2123" manufactured by Nippon Unicar Co., Ltd. was added as a leveling agent. The above primer had an isocyanate group content of 1.6 mole %. The results thereof are summarized in Table 1.

Example 12

The same procedure as in Example 1 was carried out, except that 134 g of 1,2,6-hexanetriol was reacted with 524 g of hydrogenated 4,4-diphenylmethanediisocyanate to obtain a polyisocyanate compound, and this polyisocyanate compound was used as the primer component for the humidity-curing urethane resin and that 0.3 part by weight of the leveling agent "FZ2123" manufactured by Nippon Unicar Co., Ltd. was added as a leveling agent. The above primer had an isocyanate group content of 2.0 mole %. The results thereof are summarized in Table 1.

Example 13

The same procedure as in Example 1 was carried out, except that in Example 1, no N-methyldiethanolamine was added to the photochromic curable composition, and a composition obtained by adding 0.1 part by weight of the leveling agent "L-7001" manufactured by Nippon Unicar Co., Ltd. thereto was used as the photochromic curable composition; the humidity-curing type primer "Takenate M-402P" manufactured by Mitsui Takeda Chemical Co., Ltd. was used as the primer, and this was blended with ethyl acetate in a weight ratio of 1:1; 0.5 part by weight of "Megafac F-479" manufactured by Dainippon Ink & Chemicals Inc. was added as a leveling agent and stirred under nitrogen atmosphere until the mixture was homogenized; a curing time of the above primer was set to 10 minutes under the environment of 25° C. and a humidity of 40%, and the pre-treatment of the lens base material was omitted. The above primer had an isocyanate group content of 2.4 mole %. The results thereof are summarized in Table 1.

Example 14

The same procedure as in Example 13 was carried out, except that a humidity-curing type primer "Burnock DM652" manufactured by Dainippon Ink & Chemicals Inc. was used as a primer, and this and butyl acetate were blended in a weight ratio of 3:1 and that 0.5 part by weight of the leveling agent "L-7001" manufactured by Nippon Unicar Co., Ltd. was added as a leveling agent and sufficiently stirred under nitrogen atmosphere until the mixture was homogenized. The above primer had an isocyanate group content of 3.6 mole %. The results thereof are summarized in Table 1.

Example 15

The same procedure as in Example 13 was carried out, except that 134 g of 1,2,6-hexanetriol was reacted with 287 g of a mixture (TDI80) 80:20 of 2,4-tolylenediisocyanate and 2,6-tolylenediisocyanate to obtain a polyisocyanate compound, and this was blended with butyl acetate in a weight ratio of 1:2; further, 0.5 part by weight of the leveling agent "L-7001" manufactured by Nippon Unicar Co., Ltd. was added as a leveling agent and sufficiently stirred under nitrogen atmosphere until the mixture was homogenized to obtain a polyisocyanate compound, and it was used as a primer component for a humidity-curing urethane resin. The above primer had an isocyanate group content of 1.5 mole %. The results thereof are summarized in Table 1.

Example 16

The same procedure as in Example 13 was carried out, except that 281 g of polytetramethylene etherdiol and 67 g of 1,2,6-hexanetriol were reacted with 195 g of a mixture (TDI80) 80:20 of 2,4-tolylenediisocyanate and 2,6-tolylenediisocyanate to obtain a polyisocyanate compound, and this was blended with butyl acetate in a weight ratio of 1:2; further, 0.5 part by weight of the leveling agent "L-7001" manufactured by Nippon Unicar Co., Ltd. was added as a leveling agent and sufficiently stirred under nitrogen atmosphere until the mixture was homogenized; and the composition thus obtained was used as a primer component for a humidity-curing urethane resin. The above primer had an isocyanate group content of 2.4 mole %. The results thereof are summarized in Table 1.

Example 17

The same procedure as in Example 13 was carried out, except that 60 g of butyl acetate and 0.5 g of 1,4-butanediol were added to 40 g of the polyisocyanate compound prepared in Example 16 to react them at 80° C. for 5 hours; 0.5 part by weight of the leveling agent "L-7001" manufactured by Nippon Unicar Co., Ltd. was added thereto as a leveling agent and sufficiently stirred under nitrogen atmosphere until the mixture was homogenized; and the composition thus obtained was used as a primer component for a humidity-curing urethane resin. The above primer had an isocyanate group content of 0.9 mole %. The results thereof are summarized in Table 1.

Example 18

The same procedure as in Example 13 was carried out, except that 30 g of toluene and 0.5 g of propylene glycol were added to 40 g of the polyisocyanate compound prepared in Example 16 to react them at 80° C. for 5 hours; 0.5 part by weight of the leveling agent "L-7001" manufactured by Nippon Unicar Co., Ltd. was added thereto as a leveling agent and sufficiently stirred under nitrogen atmosphere until the mixture was homogenized; and the composition thus obtained was used as a primer component for a humidity-curing urethane resin. The above primer had an isocyanate group content of 1.6 mole %. The results thereof are summarized in Table 1.

TABLE 1

| Example No. | Appearance | Adhesion |
|---|---|---|
| 1 | A | A |
| 2 | B | A |
| 3 | A | A |
| 4 | A | A |
| 5 | A | A |
| 6 | B | A |
| 7 | B | A |
| 8 | B | A |
| 9 | A | A |
| 10 | A | A |
| 11 | A | A |
| 12 | A | A |
| 13 | A | A |
| 14 | A | A |
| 15 | A | A |
| 16 | A | A |
| 17 | A | A |
| 18 | A | A |

Comparative Example 1

A photochromic cured film was prepared by the same method as in Example 1, except that used as a primer component was block type polyisocyanate "Burnock D500" manufactured by Dainippon Ink & Chemicals Inc. [the above primer component is a primer corresponding to (a component prepared by mixing block type polyisocyanate deactivated at room temperature by blocking isocyanate groups of polyisocyanate with protective groups such as methyl ethyl ketone and an active hydrogen compound and, if necessary, a curing catalyst, which is capable for forming a primer layer by heating after applying to thereby cross-link it while deblocking the protective layers) shown in the column of "RELATED ART"]; this and butyl acetate were blended in a weight ratio of 1:1 and sufficiently stirred under nitrogen atmosphere until the mixture was homogenized; and a curing temperature of the primer was set to 130° C. The appearance and the adhesion thereof were evaluated, and the results thereof are summarized in Table 2.

Comparative Example 2

A photochromic cured film was prepared by the same method as in Example 1, except that used as a primer component was block type polyisocyanate "Takenate B-883BS" manufactured by Mitsui Takeda Chemical Co., Ltd. [the above primer component is a primer corresponding to (a component prepared by mixing block type polyisocyanate deactivated at room temperature by blocking isocyanate groups of polyisocyanate with protective groups such as methyl ethyl ketone and an active hydrogen compound and, if necessary, a curing catalyst, which is capable for forming a primer layer by heating after applying to thereby cross-link it while deblocking the protective layers) shown in the column of "RELATED ART"]; this and xylene were blended in a weight ratio of 1:1 and sufficiently stirred under nitrogen atmosphere until the mixture was homogenized; and a curing temperature of the primer was set to 130° C. The appearance and the adhesion thereof were evaluated, and the results thereof are summarized in Table 2.

Comparative Example 3

The same procedure as in Example 1 was carried out, except that in Example 1, the diluent solvent for the primer was changed to acetone (boiling point: 56° C., SP value: 9.8). The results thereof are summarized in Table 2.

Comparative Example 4

The same procedure as in Example 1 was carried out, except that in Example 1, the diluent solvent for the primer was changed to diethyl ether (boiling point: 35° C., SP value: 7.3). The results thereof are summarized in Table 2.

Comparative Example 5

The same procedure as in Example 1 was carried out, except that in Example 1, the diluent solvent for the primer was changed to n-octane (boiling point: 126° C., SP value: 7.7). The results thereof are summarized in Table 2.

TABLE 2

| Comparative Example No. | Appearance | Adhesion |
|---|---|---|
| 1 | C | D |
| 2 | B | D |
| 3 | D | B |
| 4 | D | D |
| 5 | D | D |

The photochromic coating agents were prepared and evaluated in the following manners.

The abbreviations and the names of the compounds used are shown below. In respect to the radically polymerizable monomers, an L scale Rockwell hardness of a cured product obtained by casting and polymerizing (the temperature was elevated from 30° C. to 90° C. in a period of 20 hours, and the polymerization was carried out at 120° C. for 2 hours) each compound (monomer) to carry out homopolymerization was shown by "Homo-HL" in a parenthesis. The above hardness was measured by means of an Akashi Rockwell hardness meter (model: RA-10) after the cured product was maintained in a room of 25° C. for one day. Glycidyl methacrylate is an epoxy base monomer.

(1) Radically Polymerizable Monomers
High Hardness Monomers
TMPT: trimethylolpropane trimethacrylate (Homo-HL=122)
DPEHA: dipentaerythritol hexaacrylate (Homo-HL=100)
U6A: urethane oligomer hexaacrylate (Homo-HL=100) (Shin Nakamura Chemical Co., Ltd.: U-6HA)
EB6A: polyestere oligomer hexaacrylate (Homo-HL=100) (Daicel UCB Co., Ltd.: EB1830)
GMA: glycidyl methacrylate (Homo-HL=80)
BPE: 2,2-bis(4-methacryloyloxyethoxyphenyl)propane (Homo-HL=110)
Low Hardness Monomers
9GDA: polyethylene glycol diacrylate having an average molecular weight of 532 (Homo-HL<20)
MePEGMA (475): methyl ether polyethylene glycol methacrylate having an average molecular weight of 1000 (Homo-HL<20)

BPE oligo: 2,2-bis(4-methacryloyloxypolyethylene glycol phenyl)propane having an average molecular weight of 776 (Homo-HL<40)

(2) Photochromic Compound

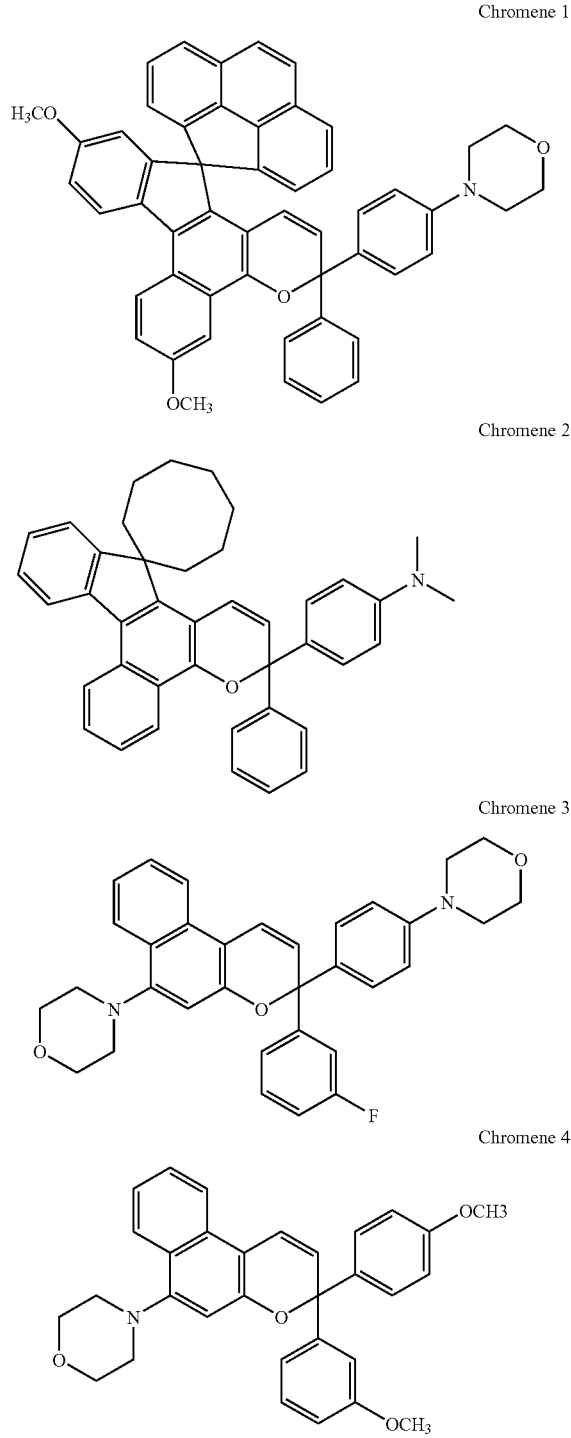

Chromene 1

Chromene 2

Chromene 3

Chromene 4

(3) Surfactant
SiL 1: silicone base surfactant "L7001" (manufactured by Nippon Unicar Co., Ltd.)
SiL 2: silicone base surfactant "FZ2123" (manufactured by Nippon Unicar Co., Ltd.)

FL 1: fluorine base surfactant "Megafac F-470" (manufactured by Dainippon Ink & Chemicals Inc.)
FL 2: fluorine base surfactant "Fluorod FC-430" (manufactured by Sumitomo 3M Co., Ltd.)
Re 1: fatty acid ester base surfactant "Adekaestol S" (manufactured by Asahi Denka Co., Ltd.)
Re 2: polyglycerin ester base surfactant "Adekanol OPG" (manufactured by Asahi Denka Co., Ltd.)

(4) Optical Materials
CR39 (allyl resin plastic lens; refractive index=1.50)
MR (thiourethane base resin plastic lens; refractive index=1.60)
TE (thioepoxy base resin plastic lens; refractive index=1.71)
SPL (methacryl base resin plastic lens; refractive index=1.54)

(5) Polymerization Initiator
CGI1800: a mixture (weight ratio 3:1) of 1-hydroxycyclohexyl phenyl ketone and bis(2,6-dimethoxybenzoyl)-2,4,4-trimethyl-pentylphosphine oxide Example 19

CR39 (allyl resin plastic lens; refractive index=1.50) was used as a lens base material. This lens base material was sufficiently degreased by acetone, and a liquid obtained by blending a humidity-curing type primer "Takenate M-402P" manufactured by Mitsui Takeda Chemical Co., Ltd. as a primer and butyl acetate in a weight ratio of 1:1, and further adding thereto 1 part by weight of a leveling agent "L-7001" (manufactured by Nippon Unicar Co., Ltd.) as a leveling agent and sufficiently stirring under nitrogen atmosphere until the mixture was homogenized, was spin-coated by means of a spin coater 1H-DX2 manufactured by MIKASA Co., Ltd. This coat was cured at 110° C. for one hour in a constant temperature device to prepare a lens base material having a primer layer. The surface thereof was subjected to treatment as pre-treatment for the lens base material by means of a corona treating apparatus MultiDyne manufactured by Navitas Co., Ltd. in order to prepare a photochromic cured film.

As for a photochromic polymerizable composition, 2,2-Bis(4-methacryloyoxypentaethoxyphenyl)-propane (average molecular weight: 776)/trimethylolpropane triacrylate/polyester oligomer hexaacrylate (EB-1830, Daicel UCB Co., Ltd.)/glycidyl methacrylate/polyethylene glycol diacrylate (average molecular weight: 532) which were radically polymerizable monomers being high or low hardness monomers were blended as a photochromic polymerizable composition respectively in a blend proportion of 50 parts by weight/15 parts by weight/10 parts by weight/10 parts by weight/15 parts by weight. 3 parts by weight of Chromene 1 was added to 100 parts by weight of the above mixture of the radically polymerizable monomers and sufficiently mixed. Further, 0.1 part by weight of "L-7001" (manufactured by Nippon Unicar Co., Ltd.) as a leveling agent was added thereto, and 0.5 part by weight of CHI1800 as a polymerization initiator, 5 parts by weight of (1,2,2,6,6-pentamethyl-4-piperidyl) sebacate as a stabilizer and 7 parts by weight of γ-methacryloyloxypropyltrimethoxysilane as a silyl monomer were added thereto and sufficiently mixed to obtain a photochromic compound-containing curable composition.

Subsequently, about 2 g of the mixed liquid obtained by the method described above was spin-coated on the surface of a lens base material by means of the spin coater 1H-DX2 manufactured by MIKASA Co., Ltd. This lens having a coated surface was irradiated for 3 minutes in nitrogen gas atmosphere by means of a metal halide lamp having an output of 120 mW/cm² to cure the coating film, and then it was further subjected to heat treatment in a constant temperature device of 110° C., whereby a photochromic cured thin film was obtained. A film thickness of the thin film thus obtained can be controlled by the conditions of spin coating.

In the present invention, a film thickness of the photochromic cured thin film was controlled to 40±1 μm.

The appearance of the optical characteristics of the photochromic cured film thus prepared was evaluated by observing the above lens base material having the cured film with using a reflection type CCD microscope. The evaluation criteria are shown below.
- A: homogeneous, and inferior appearance is not observed at all
- B: fine inferior appearance is very slightly observed
- C: inferior appearance is partially observed
- D: inferior appearance is observed on the whole or an influence is observed on the base material The appearance of the lens base material prepared by the method described above was evaluated as rank A.

An applying property which was a problem in applying a photochromic polymerizable composition on various base materials was evaluated by a wetting property of the above composition to the base material. The evaluation criteria are shown below.
- A: wetting property is good, and the composition can evenly be applied on the base material
- B: wetting property is a little inferior, but the composition can evenly be applied on the base material
- C: wetting property is inferior, and cissing of the composition is observed in an edge part of the base material
- D: wetting property is inferior, and repelling of the composition is observed in a central part of the base material An applying property of the photochromic polymerizable composition prepared by the method described above onto the base material was evaluated as rank A.

The photochromic characteristic of the above lens base material having the photochromic cured thin film was evaluated by measuring the color density by the following method.

The lens obtained having the photochromic coating layer was colored by illuminating at 20±1° C. and a beam intensity of 365 nm=2.4 mW/cm$^2$ and 245 nm=24 μW/cm$^2$ on the surface of the polymer for 120 seconds by means of a xenon lamp L-2480 (300 W) SHL-100 manufactured by Hamamatsu Photonics K.K. via an air mass filter (manufactured by Corning Incorporated, and the maximum absorption wavelength in this moment was determined by means of a spectral photometer (instantaneous multichannel photodetector MCPD1000) manufactured by Otsuka Electronics Co., Ltd. A difference {ε (120)−ε (0)} between the absorbance {ε (120)} in the maximum absorption wavelength and the absorbance {ε (0)} in the above wavelength of the cured product staying in no irradiation was determined, and this was designated as the color density. It is shown that the higher the value is, the more excellent the photochromic property is.

The lens base material having the photochromic cured film had a color density of 0.85 in a maximum absorption wavelength of 610 nm and showed good photochromic characteristics.

Subsequently, the adhesion was evaluated. In respect to the evaluation method, the lens base material having the photochromic cured film was dipped in boiling water of 100° C. for one hour and then cooled down to room temperature, and it was subjected to a crosshatch test within 30 minutes. The evaluation criteria are shown below.
- A: no peeling
- B: peeling of less than 5%
- C: peeling of 5% or more and less than 15%
- D: peeling of 15% or more An adhesion of the lens base material prepared by the method described above was ranked as A.

Examples 20 to 25

Radically polymerizable-monomer compositions, surfactants and photochromic compounds shown in Table 3 were used, and the same compounds as in Example 19 were used for the other additives to prepare photochromic polymerizable compositions and produce the lenses of the present invention having a photochromic coating layer in the same manner as in Example 19. The evaluation results thereof are shown in Table 4. The blend amounts (parts) of the surfactants and the photochromic compounds in Table 3 are blend amounts (parts) per 100 parts by weight of the whole radically polymerizable monomers.

TABLE 3

| | Radically polymerizable monomer | | | Photochromic | |
|---|---|---|---|---|---|
| Example No. | High hardness monomer (weight part) | Low hardness monomer (weight part) | Surfactant (part) | compound (part) | Lens base material |
| 19 | BPE/TMPT/EB6A/GMA 50/15/10/10 | 9GDA 15 | SiL 1 0.1 | Chromene 1 3 | CR |
| 20 | BPE/TMPT/U6A/GMA 40/20/10/10 | 9GDA 20 | FL 1 0.05 | Chromene 1 3 | CR |
| 21 | BPE/TMPT/EB6A/GMA 45/15/10/10 | 9GDA/MePEGMA 10/10 | SiL 2 0.2 | Chromene 2 3 | MR |
| 22 | DPEHA/TMPT/EB6A/GMA 50/20/5/10 | MePEGMA 15 | FL 2 0.1 | Chromene 2 3 | TE |
| 23 | DPEHA/TMPT/U6A/GMA 45/15/10/10 | MePEGMA/BPE Oligo 10/10 | SiL 1 0.1 | Chromene 2 3 | SPL |
| 24 | BPE/TMPT/EB6A/GMA 50/15/10/10 | 9GDA 15 | FL 1 0.05 | Chromene 2/Chromene 3 2.5/1.5 | CR |
| 25 | BPE/TMPT/EB6A/GMA 45/15/10/10 | 9GDA/MePEGMA 10/5 | SiL 1 0.1 | Chromene 1/Chromene 4 2.5/1.5 | MR |

TABLE 4

| Example No. | Appearance Applying property | evaluation of coating film | Photochromic characteristics λ max (nm) | Color density | Adhesion |
|---|---|---|---|---|---|
| 19 | A | A | 610 | 0.85 | A |
| 20 | A | A | 610 | 0.88 | A |
| 21 | A | A | 588 | 1.22 | A |
| 22 | A | A | 588 | 1.18 | A |
| 23 | A | A | 590 | 1.34 | A |
| 24 | A | A | 588 | 1.02 | A |
| 25 | A | A | 608 | 0.78 | A |

Reference Examples 1 to 6

For further comparison, radically polymerizable monomer compositions, surfactants and photochromic compounds shown in Table 5 were used to prepare lenses having a photochromic coating layer in the same manner as in Example 19. The evaluation results thereof are shown in Table 6.

TABLE 5

| Reference Example No. | Radically polymerizable monomer | | Surfactant (part) | Photochromic compound (part) | Lens base material |
|---|---|---|---|---|---|
| | High hardness monomer (weight part) | Low hardness monomer (weight part) | | | |
| 1 | BPE/TMPT/U6A/GMA 40/20/10/10 | 9GDA 20 | — | Chromene 1 3 | CR |
| 2 | BPE/TMPT/EB6A/GMA 45/15/10/10 | 9GDA/MePEGMA 10/10 | Re 1 0.2 | Chromene 2 3 | MR |
| 3 | BPE/TMPT/EB6A/GMA 45/15/10/10 | 9GDA/MePEGMA 10/10 | Re 2 10 | Chromene 2 3 | MR |
| 4 | DPEHA/TMPT/U6A/GMA 45/15/10/10 | MePEGMA/BPE Oligo 10/10 | FL 2 10 | Chromene 2 3 | SPL |
| 5 | BPE/TMPT/EB6A/GMA 50/15/10/10 | 9GDA 15 | — | Chromene 2/Chromene 3 2.5/1.5 | CR |
| 6 | BPE/TMPT/EB6A/GMA 55/15/15/15 | — | SiL 1 0.1 | Chromene 1 3 | CR |

TABLE 6

| Reference Example No. | Appearance Applying property | evaluation of coating film | Photochromic characteristics λ max (nm) | Color density | Adhesion |
|---|---|---|---|---|---|
| 1 | C | D | 610 | 0.88 | A |
| 2 | C | D | 588 | 1.22 | C |
| 3 | C | D | 588 | 0.61 | D |
| 4 | A | A | 590 | 0.58 | D |
| 5 | D | D | 590 | 1.34 | A |
| 6 | A | A | 610 | 0.34 | A |

As apparent from the results summarized in Table 3 and Table 4, the applying property and the optical characteristics of the photochromic polymerizable compositions containing the silicone base surfactants or the fluorine base surfactants were good, and the adhesion the and photochromic characteristics were good as well.

On the other hand, as shown in Reference Example 1 and Reference Example 5 shown in Tables 5 and 6, the applying property and the optical characteristics were very inferior when using the photochromic polymerizable compositions which did not contain the silicone base surfactants or the fluorine base surfactants. In Reference Example 2 using the fatty acid ester base surfactant and Reference Example 3 using the polyglycerin base surfactant, the applying property and the optical characteristics were not improved, and the adhesion was inferior as well. Further, in Reference Example 6 using no low hardness monomer in the radically polymerizable monomer composition, the good photochromic characteristics were not obtained.

Further, an optical base material comprising a layered structure in which the humidity-curing polyurethane resin layer of the present invention was formed was prepared and evaluated for an impact resistance in the following manners.

CR39 (allyl resin plastic lens; refractive index=1.50) was used as an optical base material. As for a primer, was used a composition prepared by blending a humidity-curing type primer "Takenate M-605N" manufactured by Mitsui Takeda Chemical Co., Ltd. and butyl acetate in a weight ratio of 1:1 and sufficiently stirring it under nitrogen atmosphere until the mixture was homogenized. This was spin-coated on the optical base material by means of a spin coater 1H-DX2 manufactured by MIKASA Co., Ltd. and cured at 110° C. for one hour in a constant temperature device to prepare an optical base material having a polyurethane resin layer. The impact resistance was evaluated by the weight of a steel ball, wherein the steel ball was allowed to naturally fall down onto a test plate having a thickness of 2 mm and a diameter of 65 mm from a height of 127 cm to break the test plate. The evaluation criteria were set to "1" when the weight of the steel ball was 20 g or less, "2" when it was 20 to 40 g, "3" when it was 40 to 60 g, "4" when it was 60 to 80 g and "5" when it was 80 g or more. The evaluation result of an impact resistance of CR39 having no polyurethane resin layer was "3", and the evaluation result of an impact resistance of CR39 having the polyurethane resin layer prepared in the manner described above was "5". It can be found from the above matter that the impact resistance was improved by the layered structure in which the polyurethane resin layer was formed.

The invention claimed is:

1. A laminated product comprising a layered structure in which a 0.1 to 10 μm thick polyurethane resin layer formed by applying a coating liquid consisting of a humidity-curing polyurethane resin and/or a precursor thereof, a solvent having a boiling point of 70° C. or higher and a solubility parameter of 8 or more, and a leveling agent on at least one surface of an optical base material, then removing the solvent, and curing the humidity-curing polyurethane resin and/or precursor thereof, and a 10-100 μm thick resin layer obtained by curing a composition which comprises a radically polymerizable monomer, a photochromic compound and a silicone base or fluorine base surfactant are laminated in this order on a surface of the optical base material, wherein the polyurethane resin layer is directly applied to the optical base material.

2. The laminated product as claimed in claim 1, wherein the optical base material has a face constituted from a three dimensional cross-linked product, and the polyurethane resin layer is formed on the face.

3. The laminated product as claimed in claim 1, wherein bubbles are not substantially present in the polyurethane resin layer.

4. The laminated product as claimed in claim 1, wherein the resin layer containing a photochromic compound comprises a cured product of a curable composition comprising 100 parts by weight of a radically polymerizable monomer, 0.001 to 5 parts by weight of a silicone base or fluorine base surfactant and 0.01 to 20 parts by weight of a photochromic compound.

5. A production process for a laminated product, comprising:

a step of forming a polyurethane resin layer by applying a coating liquid consisting of a humidity-curing polyurethane resin and/or a precursor thereof, a solvent having a boiling point of 70° C. or higher and a solubility parameter of 8 or more, and a leveling agent on at least one surface of an optical base material, then removing the solvent, and curing the humidity-curing polyurethane resin and/or precursor thereof, and a step of forming a 10-100 μm thick resin layer containing a photochromic compound by applying a curable composition comprising 100 parts by weight of a radically polymerizable monomer, 0.001 to 5 parts by weight of a silicone base or fluorine base surfactant and 0.01 to 20 parts by weight of a photochromic compound on the polyurethane resin layer and curing the curable composition, wherein the polyurethane resin layer is directly applied to the optical base material.

* * * * *